US011708478B2

(12) United States Patent
Rentsch et al.

(10) Patent No.: US 11,708,478 B2
(45) Date of Patent: Jul. 25, 2023

(54) USE OF MONO-SUBSTITUTED SUCCINIC ANHYDRIDE

(71) Applicant: Omya International AG, Oftringen (CH)

(72) Inventors: Samuel Rentsch, Spiegel bei Bern (CH); Matthias Welker, Hésingue (FR); Christopher Pichler, Sierre (CH); Martin Brunner, Wallbach (CH); Michael Knerr, Oftringen (CH); Tazio Fornera, Zofingen (CH)

(73) Assignee: OMYA INTERNATIONAL AG, Oftringen (CH)

( * ) Notice: Subject to any disclaimer, the term of this patent is extended or adjusted under 35 U.S.C. 154(b) by 0 days.

(21) Appl. No.: 16/305,499

(22) PCT Filed: Jul. 13, 2017

(86) PCT No.: PCT/EP2017/067674
§ 371 (c)(1),
(2) Date: Nov. 29, 2018

(87) PCT Pub. No.: WO2018/015262
PCT Pub. Date: Jan. 25, 2018

(65) Prior Publication Data
US 2020/0325302 A1    Oct. 15, 2020

(30) Foreign Application Priority Data
Jul. 19, 2016 (EP) .................................... 16180243

(51) Int. Cl.
C08K 5/1539 (2006.01)
C08K 3/26 (2006.01)
C08K 9/04 (2006.01)
C08L 67/04 (2006.01)
C09C 1/02 (2006.01)

(52) U.S. Cl.
CPC .............. *C08K 5/1539* (2013.01); *C08K 3/26* (2013.01); *C08K 9/04* (2013.01); *C08L 67/04* (2013.01); *C09C 1/021* (2013.01); C08K 2003/265 (2013.01)

(58) Field of Classification Search
CPC ..... C08L 67/04; C08K 3/26; C08K 2003/265; C08K 5/1539; C09C 1/021
See application file for complete search history.

(56) References Cited

U.S. PATENT DOCUMENTS

| 3,926,873 | A | 12/1975 | Aishima et al. |
| 4,328,041 | A | 5/1982 | Wilson |
| 4,359,556 | A * | 11/1982 | Lakshmanan .......... C09J 177/08 525/420.5 |
| 4,407,986 | A | 10/1983 | Nomura et al. |
| 4,520,073 | A | 5/1985 | Randolph et al. |
| 4,876,152 | A | 10/1989 | Kang |
| 5,135,967 | A | 8/1992 | Aumann et al. |
| 7,300,974 | B2 | 11/2007 | Blanchard et al. |
| 7,341,704 | B2 | 3/2008 | Kasahara et al. |
| 7,507,561 | B2 | 3/2009 | Ramakrishna et al. |
| 9,012,554 | B2 | 4/2015 | Saunders et al. |
| 2002/0102404 | A1 | 8/2002 | Nakai et al. |
| 2004/0162376 | A1 | 8/2004 | Blanchard et al. |
| 2006/0020056 | A1* | 1/2006 | Dombrowski ........... C08K 9/08 523/210 |
| 2006/0148930 | A1 | 7/2006 | Blanchard et al. |
| 2007/0213434 | A1* | 9/2007 | Lima ...................... C08K 5/092 524/112 |
| 2007/0256598 | A1 | 11/2007 | Blanchard et al. |
| 2009/0227721 | A1 | 9/2009 | Blanchard et al. |

(Continued)

FOREIGN PATENT DOCUMENTS

EP   0325114 A2   7/1989
EP   0383446 A1   8/1990

(Continued)

OTHER PUBLICATIONS

Google Patents translation of JP 11-060928 (1999, 8 pages).*
Nekhamanurak, The influence of micro-/nano-CaCO3 on thermal stability and metl rheology behavior of poly(lactic acid), Energy Procedia, 56, 2014, pp. 118-128.*
Kim, Mechanical Properties and Thermal Stability of Poly(L-lactide)/Calcium Carbonate Composites, Journal of Applied Polymer Science, 109, 2008, pp. 3087-3092.*
The International Search Report dated Sep. 5, 2017 from PCT/EP2017/067674.
The Written Opinion of the International Searching Authority dated Sep. 5, 2017 from PCT/EP2017/067674.

(Continued)

Primary Examiner — Brieann R Johnston
(74) Attorney, Agent, or Firm — ALGM LLP; Harry J. Guttman

(57) ABSTRACT

The present invention refers to the use of at least one mono-substituted succinic anhydride before or during extrusion of a polymer composition comprising polylactic acid as polymer component and at least one calcium carbonate-comprising material as filler, to reduce the polymer decomposition during processing and/or to decrease the melt flow rate of such an extruded polymer as well as a method for reducing the polymer decomposition during processing and decreasing the melt flow rate of a polymer composition comprising polylactic acid as polymer component and at least one calcium carbonate-comprising material as filler, the use of a polymer composition obtainable by a process comprising the steps of a) providing at least one polylactic acid as polymer component, b) providing at least one calcium carbonate-comprising material as filler, c) providing at least one mono-substituted succinic anhydride and d) contacting the components of a), b) and c) in any order and e) extruding the contacted components of step d) as well as an article comprising a polymer composition obtainable by the aforementioned process.

19 Claims, 2 Drawing Sheets

(56) References Cited

U.S. PATENT DOCUMENTS

| | | |
|---|---|---|
| 2009/0324979 A1 | 12/2009 | Roussel |
| 2011/0100575 A1 | 5/2011 | Schmidt-Thuemmes et al. |
| 2011/0245396 A1 | 10/2011 | Blanchard et al. |
| 2012/0288650 A1 | 11/2012 | Freese et al. |
| 2014/0134380 A1 | 5/2014 | Yoon et al. |
| 2015/0240056 A1* | 8/2015 | Rentsch .................... D01F 1/02 442/327 |

FOREIGN PATENT DOCUMENTS

| | | | | |
|---|---|---|---|---|
| EP | 2371766 | A1 | 10/2011 | |
| EP | 2447213 | A1 | 5/2012 | |
| EP | 2524898 | A1 | 11/2012 | |
| EP | 2554358 | A1 | 2/2013 | |
| EP | 2607399 | A1 | 6/2013 | |
| EP | 2840065 | A1 | 2/2015 | |
| GB | 2336366 | A | 10/1999 | |
| JP | 54162746 | | 12/1979 | |
| JP | 11060928 | A * | 3/1999 | |
| KR | 2010/0108683 | A | 10/2010 | |
| WO | 9202587 | A1 | 2/1992 | |
| WO | 95/20615 | A1 | 8/1995 | |
| WO | 97147670 | A1 | 12/1997 | |
| WO | 9961521 | A1 | 12/1999 | |
| WO | 0020336 | A1 | 4/2000 | |
| WO | 0132787 | A1 | 5/2001 | |
| WO | 03082966 | A1 | 10/2003 | |
| WO | 2004/057008 | A1 | 7/2004 | |
| WO | WO-2007110611 | A1 * | 10/2007 | ........... A61L 31/127 |
| WO | 2008077156 | A2 | 6/2008 | |
| WO | 2010/001268 | A2 | 1/2010 | |
| WO | 2011/124564 | A1 | 10/2011 | |
| WO | 2011/147778 | A1 | 12/2011 | |
| WO | 2012/018327 | A1 | 2/2012 | |
| WO | 2012/094758 | A1 | 7/2012 | |
| WO | 2013/142473 | A1 | 9/2013 | |
| WO | 2013/169174 | A1 | 11/2013 | |
| WO | 2013/190274 | A2 | 12/2013 | |
| WO | 2014/060286 | A1 | 4/2014 | |
| WO | 2015/185533 | A1 | 12/2015 | |
| WO | 2016/087286 | A1 | 6/2016 | |

OTHER PUBLICATIONS

Hu et al. "Superhydrophobio Surface Fabricated from Fatty Acid-Modified Precipitated Calcium Carbonate." Ind. Eng. Chem. Res. 2010, 49, pp. 5625-5630.

The International Search Report dated Nov. 20, 2013 for PCT Application No. PCT/EP2013/071185.

The Written Opinion of the International Searching Authority dated Nov. 20, 2013 for PCT Application No. PCT/EP2013/071185.

Octadecenysuccinic anhydride from www.buyersguidechem.com. {Year: 2019}.

Tabtiang, A., et al., "The performance of selected unsaturated coatings for calcium carbonate filler in polypropylene," European Polymer Journal 36 (2000) 137-148.

Xu et al. (2011) "Effects of Temperature and pH on the Degradation of Poly(lactic acid) Brushes" Macromolecules, vol. 44, pp. 4777-4782.

Office actions and Responses for U.S. Appl. No. 14/431,345 dated Oct. 2017 to Jul. 2020, 140 pages.

Restriction Requirement in U.S. Appl. No. 16/862,483 dated Mar. 29, 2021, 9 pages.

Response to Restriction Requirement in U.S. Appl. No. 16/862,483 dated Sep. 24, 2021, 16 pages.

NonFinal Office action in U.S. Appl. No. 16/862,483 dated Dec. 8, 2021, 25 pages.

\* cited by examiner

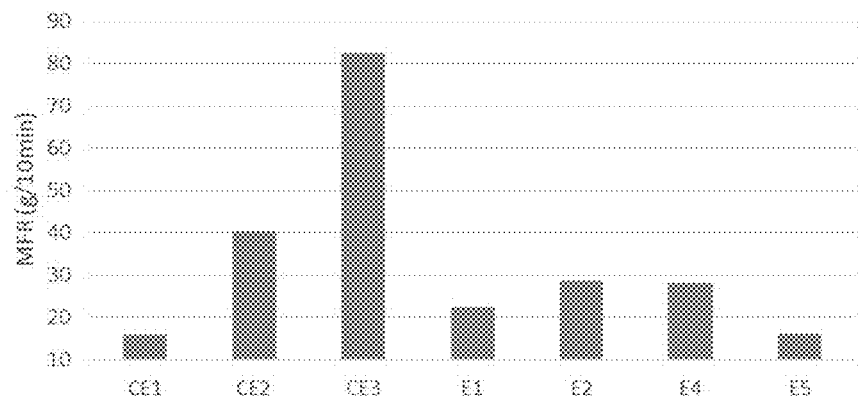
Fig. 1: melt flow rate of CE1 and examples with 20 pph filler loading
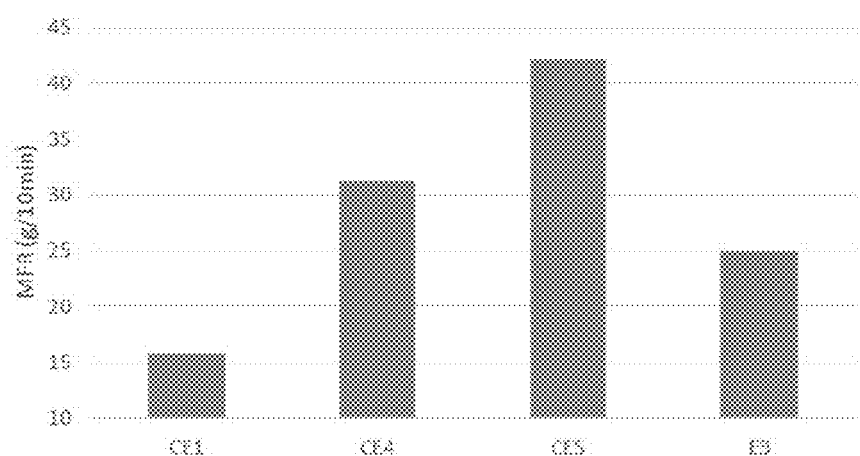
Fig. 2: melt flow rate of CE1 and examples with 10 pph filler loading

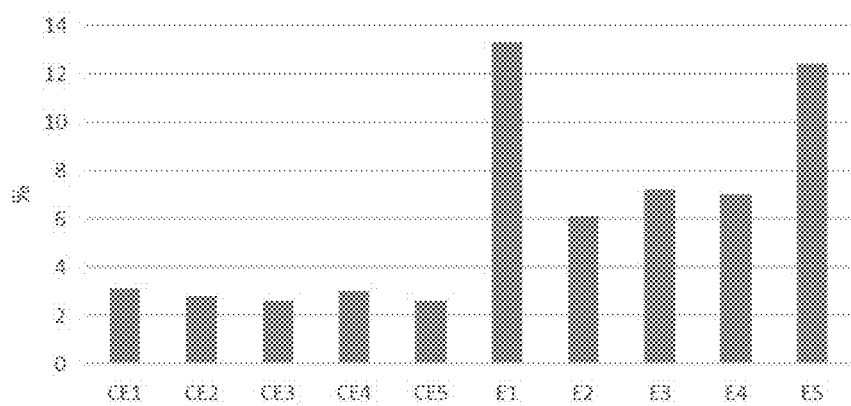
Fig. 3: tensile strain at break of comparative examples CE1 to CE5 and inventive examples E1 to E5

USE OF MONO-SUBSTITUTED SUCCINIC ANHYDRIDE

CROSS-REFERENCE TO RELATED APPLICATIONS

This is a U.S. national phase of PCT Application No. PCT/EP2017/067674, filed Jul. 13, 2017, which claims priority to European Application No. 16180243.4, filed Jul. 19, 2016.

The present invention refers to the use of mono-substituted succinic anhydride in relation to the extrusion of polymer compositions as well as to a method for reducing polymer decomposition during processing.

Nowadays many products are made from plastic since this material is light, strong, easily processed and unbreakable. Often these products are disposable items or products that are only used once. Mostly these plastic articles are produced from various synthetic resins and, therefore, are devoid of any bio-degradability. For example, plastic bags made of polyvinyl chloride are not bio-decomposable by the action of microorganisms but need to be burnt in waste incineration plants. Furthermore, such plastic bags are often thoughtlessly discarded in nature, and may remain in the soil semi-permanently without undergoing any chemical decomposition and often represent a serious danger for animal, human health and safety, and the environment.

For some years it is tried to improve this situation by replacing the plastic material by other different materials, and especially by bio-degradable polymers. Bio-degradable polymers are a specific type of polymer that breaks down after its intended purpose to result in natural byproducts such as gases, water, biomass, and inorganic salts. These polymers are found both naturally and synthetically made, and largely consist of ester, amide, and ether functional groups. Their properties and breakdown mechanism are determined by their exact structure. Such products and materials are known in the prior art for some years. For example, in WO 95/20615 bio-degradable polyhydroxyalkanoate copolymers are disclosed as well as plastic articles comprising these copolymers. The aforementioned copolymers are compostable and, therefore, are capable of being processed in a composting facility. Further bio-degradable plastics are known in the prior art from, for example, WO 2013/169174 or from US 2014/0134380.

Another known bio-degradable polymer is polylactic acid or polylactide (PLA). PLA is a bio-degradable thermoplastic aliphatic polyester derived from renewable resources, such as corn starch, tapioca roots, chips or starch, or sugarcane. Due to the chiral nature of lactic acid, several distinct forms of polylactide exist, for example, poly-L-lactide (PLLA) is the product resulting from polymerization of L,L-lactide (also known as L-lactide). In 2010, PLA had the second highest consumption volume of any bioplastic of the world. However, the production of such bio-degradable polymers is often very difficult and expensive.

It is known in the prior art to incorporate particulate fillers in polymer materials in order to safe polymers and raw materials as well as in order to change the properties of polymers. By incorporating such fillers less polymer is used and, therefore, the incorporation of fillers in polymer compositions may lead to a reduction of polymer material. Thereby, the end price of the polymer product may be decreased. Furthermore, fillers are often used to change and/or improve the properties of polymer material. For example, fillers are added to change the colour of the polymer. Alternatively, fillers are added with the aim of changing the chemical and mechanical properties of the polymer, for example, to change the softening temperature, the Young's modulus, impact strength or tensile strength.

As described above, fillers are discrete particles that are added to material like plastics, to lower the consumption of more expensive binder material or to better some properties of the mixtured material. Among the most important fillers, calcium carbonate holds the largest market volume and is mainly used in the plastics sector.

Materials comprising bio-degradable polymers like polylactic acid and fillers like calcium carbonate are described in a number of documents. For instance, WO 2013/190274 A2 refers to compositions comprising a biopolymer and a particulate mineral filler. The biopolymer can be polylactic acid, and the particulate mineral filler comprises calcined clay promoting the biodegradability of such biopolymers, WO 2012/094758 A1 refers to a polylactic acid resin composition comprising a chain mobility additive and a mineral filler. Examples of mineral fillers include talc, silica, silicates, calcium carbonate, calcium sulphate, mica, wollastonite, kaolin and combinations thereof.

WO 2012/018327 refers to high heat resistant polymer compositions comprising poly(lactic acid) and methods of making the high heat resistant polymer compositions. The polymer compositions comprise a poly(lactic acid), an aliphatic polyester, and an organically coated calcium carbonate.

WO 2015/185533 relates to a polymer composition comprising at least 20.0 wt.-%, based on the total weight of the polymer composition, of at least one biodegradable polymer resin, from 0.1 to 20.0 wt.-%, based on the total weight of the polymer composition, of at least one polyolefin selected from polyethylene and/or polypropylene and from 5.9 to 60.0 wt.-%, based on the total weight of the polymer composition, of an inorganic filler material dispersed in the at least one polyolefin and the at least one biodegradable polymer resin. The filler material may be an alkaline inorganic filler material.

WO 2010/001268 A2 refers to a bio-degradable packaging film, wherein the film includes a blend that comprises: at least one thermoplastic starch in an amount of from about 10 wt. % to about 60 wt. % of the blend, at least one polylactic acid in an amount of from about 1 wt. % to about 30 wt. % of the blend, at least one aliphatic-aromatic copolyester in an amount of from about 20 wt. % to about 70 wt. % of the blend, and at least one filler in an amount of from about 1 wt. % to about 25 wt. % of the blend, wherein the ratio of the total weight percentage of the aliphatic-aromatic copolyester and thermoplastic starch to the total weight percentage of the polylactic acid and filler is from about 1 to about 10.

EP 2 554 358 A1 refers to a moisture-permeable and waterproof film that is bio-degradable comprising polylactic acid and an inorganic filler. The inorganic filler is selected from the group consisting of calcium carbonate, barium carbonate, calcium sulphate, barium sulphate, magnesium hydroxide, aluminum hydroxide, calcium hydroxide, magnesium oxide, titanium oxide, zinc oxide, silicon oxide and talc.

US 2012/0288650 A1 refers to a bio-degradable polyester film comprising: i) from 75 to 100% by weight, based on the total weight of components i to ii, of a bio-degradable polyester based on aliphatic and/or aromatic dicarboxylic acids and on an aliphatic dihydroxy compound; ii) from 0 to 25% by weight, based on the total weight of components i to ii, of polylactic acid; iii) from 10 to 25% by weight, based on the total weight of components i to v, of calcium carbonate; iv) from 3 to 15% by weight, based on the total weight of components i to v, of talc; v) from 0 to 1% by weight, based on the total weight of components i to v, of a copolymer which contains epoxy groups and is based on styrene, acrylic ester, and/or methacrylic ester; vi) from 0 to 2% by weight, based on the total weight of components i to v, of 2-(4,6-bisbiphenyl-4-yl-1,3,5-triazin-2-yl)-5-(2-ethyl-(n)-hexyloxy)phenol.

A general disadvantage which is observed when calcium carbonate is incorporated in polymer compositions comprising polylactic acid is that the mechanical or rheological properties of these polymer compositions deteriorate. The incorporation of calcium carbonate in bio-degradable polymers like polylactic acid especially leads to a higher melt flow rate. This means that the polymer becomes more fluid upon heating which is an indication for a lowering of the molecular weight of the polymers or the hydrolysis of the polymers. If the polymer gets too liquid/fluid this represents a problem or disadvantage for the processing of the polymer, not only in regular processing but also during recycling processes.

Thus, there is still a need in the art for technical solutions which address the foregoing technical problems and which especially allow for improving the thermal stability and processability of a polymer composition comprising polylactic acid as polymer component and calcium carbonate-comprising material as filler at high temperatures. Furthermore, there is still the need for polymer compositions comprising polylactic acid as polymer component and calcium carbonate-comprising material as filler with improved mechanical properties and especially with a decreased melt flow rate.

Accordingly, it is an objective of the present invention to provide a technical solution which addresses the above-mentioned problems and which especially improves the stability of a polymer composition comprising polylactic acid as polymer component and calcium carbonate-comprising material as filler during processing especially the thermal stability. A further objective is to facilitate the processability of a polymer composition comprising polylactic acid as polymer component and calcium carbonate-comprising material as filler during processing especially at high temperatures. Another object of the present invention is to improve the mechanical properties, especially the melt flow rate of a polymer composition comprising polylactic acid as polymer component and calcium carbonate-comprising material as filler.

The foregoing and other objectives are solved by the subject-matter as defined herein in claim 1.

Advantageous embodiments of the invention are defined in the corresponding sub-claims.

According to one aspect of the present invention at least one mono-substituted succinic anhydride is used before or during compounding of a polymer composition comprising polylactic acid as polymer component and at least one calcium carbonate-comprising material as filler, to reduce the polymer decomposition during processing and/or to decrease the melt flow rate of such a compounded polymer composition by at least 10%, measured according to DIN EN ISO 1133-1:2011 (procedure A, 2.16 kg, 210° C., granules), in comparison to the same polymer composition that has been treated the same way without (i.e. in the absence of) at least one mono-substituted succinic anhydride.

The inventors surprisingly found out that according to the present invention, the stability especially the thermal stability of a polymer composition comprising polylactic acid as polymer component and calcium carbonate-comprising material as filler can be significantly improved when using at least one mono-substituted succinic anhydride before or during compounding of the polymer composition. Furthermore, the inventors surprisingly found that the processability of a polymer composition can be facilitated when using at least one mono-substituted succinic anhydride before or during compounding of the polymer composition. Furthermore, according to the present invention, the mechanical properties and especially the melt flow rate of a polymer composition comprising polylactic acid as polymer component and calcium carbonate-comprising material as filler can be improved. In particular, this is achieved by using at least one mono-substituted succinic anhydride before or during compounding of the polymer composition.

According to another aspect of the present invention a method for reducing the polymer decomposition during processing and/or decreasing the melt flow rate of a polymer composition comprising polylactic acid as polymer component and at least one calcium carbonate-comprising material as filler, by at least 10%, measured according to DIN EN ISO 1133-1:2011 (procedure A, 2.16 kg, 210° C., granules), in comparison to the same polymer composition that has been treated the same way without at least one mono-substituted succinic anhydride is provided, the method comprising
  a) providing at least one polylactic acid as polymer component and
  b) providing at least one calcium carbonate-comprising material as filler and
  c) providing at least one mono-substituted succinic anhydride
  d) contacting the components of a), b) and c) in any order and
  e) compounding the contacted components of step d).

According to another aspect of the present invention the use of a polymer composition obtainable by a process comprising the steps of
  a) providing at least one polylactic acid as polymer component and
  b) providing at least one calcium carbonate-comprising material as filler and
  c) providing at least one mono-substituted succinic anhydride
  d) contacting the components of a), b) and c) in any order and
  e) compounding the contacted components of step d),
  in hygiene products, medical and healthcare products, filter products, geotextile products, agriculture and horticulture products, clothing, footwear and baggage products, household and industrial products, packaging products, construction products and the like is provided.

According to another aspect of the present invention an article comprising a polymer composition obtainable by a process comprising the steps of
  a) providing at least one polylactic acid as polymer component and
  b) providing at least one calcium carbonate-comprising material as filler and
  c) providing at least one mono-substituted succinic anhydride
  d) contacting the components of a), b) and c) in any order and
  e) compounding the contacted components of step d),
  wherein the article is selected from the group comprising hygiene products, medical and healthcare products, filter products, geotextile products, agriculture and horticulture products, clothing, footwear and baggage products, household and industrial products, packaging products, construction products and the like is provided.

Advantageous embodiments of the present invention are defined in the corresponding sub-claims.

According to one embodiment of the present invention the at least one mono-substituted succinic anhydride consists of succinic anhydride mono-substituted with a group selected from a linear, branched, aliphatic and cyclic group having a total amount of carbon atoms from C2 to C30 and in case of branched groups C3-C30, preferably from C3 to C25, and most preferably from C4 to C20 in the substituent.

According to another embodiment of the present invention, the at least one mono-substituted succinic anhydride is at least one alkyl mono-substituted succinic anhydride, preferably at least one alkyl mono-substituted succinic anhydride selected from the group consisting of ethylsuccinic anhydride, propylsuccinic anhydride, butylsuccinic anhydride, triisobutyl succinic anhydride, pentylsuccinic anhydride, hexylsuccinic anhydride, heptylsuccinic anhydride, octylsuccinic anhydride, nonylsuccinic anhydride, decyl succinic anhydride, dodecyl succinic anhydride, hexadecanyl succinic anhydride, octadecanyl succinic anhydride, and mixtures thereof and/or at least one alkenyl mono-substituted succinic anhydride, preferably at least one alkenyl mono-substituted succinic anhydride selected from the group comprising ethenylsuccinic anhydride, propenylsuccinic anhydride, butenylsuccinic anhydride, triisobutenyl succinic anhydride, pentenylsuccinic anhydride, hexenylsuccinic anhydride, heptenylsuccinic anhydride, octenylsuccinic anhydride, nonenylsuccinic anhydride, decenyl succinic anhydride, dodecenyl succinic anhydride, hexadecenyl succinic anhydride, octadecenyl succinic anhydride, and mixtures thereof.

According to another embodiment of the present invention, the at least one mono-substituted succinic anhydride is used before compounding of the polymer composition in that the at least one mono-substituted succinic anhydride and/or salty reaction products thereof are present on the surface of the at least one calcium carbonate-comprising material.

According to another embodiment of the present invention, the at least one mono-substituted succinic anhydride is used during compounding of the polymer composition in that the at least one mono-substituted succinic anhydride is contacted under mixing with the polymer composition comprising polylactic acid as polymer component and at least one calcium carbonate-comprising material as filler.

According to another embodiment of the present invention, the at least one mono-substituted succinic anhydride and/or salty reaction products thereof are present in the polymer composition in an amount of at least 0.1 wt.-%, based on the total dry weight of the at least one calcium carbonate-comprising filler material, preferably in an amount from 0.1 to 4.0 wt.-%, more preferably in an amount from 0.1 to 3.0 wt.-%, even more preferably in an amount from 0.2 to 2.0 wt.-%, even more preferably in an amount from 0.3 to 1.5 wt.-% and most preferably in an amount from 0.4 to 1.2 wt.-%.

According to another embodiment of the present invention, the polymer component consists only of polylactic acid.

According to another embodiment of the present invention, the at least one mono-substituted succinic anhydride and/or salty reaction products thereof are present in the polymer composition in an amount of at least 0.005 wt.-%, based on the total weight of the polymer component, preferably in an amount from 0.01 to 5.0 wt.-%, more preferably in an amount from 0.02 to 1.0 wt.-%, even more preferably in an amount from 0.03 to 0.8 wt.-%, even more preferably in an amount from 0.05 to 0.5 wt.-% and most preferably in an amount from 0.07 to 0.3 wt.-%.

According to another embodiment of the present invention, the calcium carbonate-comprising material is selected from the group consisting of ground calcium carbonate, preferably marble, limestone, dolomite and/or chalk, precipitated calcium carbonate, preferably vaterite, calcite and/or aragonite, and mixtures thereof, more preferably the calcium carbonate-comprising material is ground calcium carbonate.

According to another embodiment of the present invention, the calcium carbonate-comprising material has i) a weight median particle size $d_{50}$ value in the range from 0.1 µm to 10 µm, preferably in the range from 0.25 µm to 7 µm, more preferably in the range from 0.5 µm to 5 µm and most preferably in the range from 0.7 µm to 4 µm and/or ii) a top cut ($d_{98}$) of ≤15 µm, preferably of ≤12.5 µm, more preferably of ≤10 µm and most preferably of ≤7.5 µm and/or iii) a specific surface area (BET) of from 0.5 to 150 $m^2/g$ as measured using nitrogen and the BET method according to ISO 9277:2010, preferably from 1 to 60 $m^2/g$, and more preferably from 1.5 to 15 $m^2/g$ and/or iv) a residual total moisture content of from 0.01 wt.-% to 1 wt.-%, based on the total dry weight of the at least one calcium carbonate-comprising material, preferably from 0.02 wt.-% to 0.5 wt.-%, more preferably from 0.03 wt.-% to 0.3 wt.-%, and most preferably from 0.04 wt.-% to 0.15 wt.-%.

According to another embodiment of the present invention, the calcium carbonate-comprising material is present in the polymer composition in an amount from 0.1 to 85 wt.-%, based on the total weight of the polymer component, preferably in an amount from 3 to 50 wt.-%, more preferably in an amount from 5 to 40 wt.-%, and most preferably in an amount from 10 to 30 wt.-%.

According to another embodiment of the present invention, the polymer composition may comprise further additives such as colouring pigments, dyes, waxes, lubricants, oxidative- and/or UV-stabilizers, antioxidants and other fillers, such as talc.

According to another embodiment of the present invention, the tensile strain at break of the polymer composition is increased by at least 40%, preferably by at least 100%, more preferably by at least 200% and most preferably by at least 300%, in comparison to the same polymer composition without at least one mono-substituted succinic anhydride.

According to another embodiment of the present invention, the melt flow rate of the polymer composition is decreased by at least 15%, measured according to DIN EN ISO 1133-1:2011 (procedure A, 2.16 kg, 210° C., granules), preferably by at least 20% and most preferably by at least 25%, in comparison to the same polymer composition without at least one mono-substituted succinic anhydride.

According to another embodiment of the present invention, in contacting step d) firstly the at least one calcium carbonate-comprising material of step b) is contacted under mixing, in one or more steps, with the at least one mono-substituted succinic anhydride of step c) such that a treatment layer comprising the at least one mono-substituted succinic anhydride and/or salty reaction product(s) thereof is formed on the surface of said at least one calcium carbonate-comprising material of step b), and secondly this surface-treated calcium carbonate-comprising material is contacted under mixing, in one or more steps, with the polylactic acid.

It should be understood that for the purposes of the present invention, the following terms have the following meanings:

The term "succinic anhydride", also called dihydro-2,5-furandione, succinic acid anhydride or succinyl oxide, has the molecular formula $C_4H_4O_3$ and is the acid anhydride of succinic acid and is known under the CAS number 108-30-5.

The term "mono-substituted succinic anhydride" in the meaning of the present invention refers to a succinic anhydride wherein a hydrogen atom is substituted by another substituent.

The term "salty reaction products of at least one mono-substituted succinic anhydride" in the meaning of the present invention refers to products obtained by contacting a calcium carbonate-comprising filler material with one or more mono-substituted succinic anhydride(s). Said salty reaction products are formed between the mono-substituted succinic acid which is formed from the applied mono-substituted succinic anhydride and reactive molecules located at the surface of the calcium carbonate-comprising filler material.

The term "compounding" according to the present invention refers to the preparation of a polymer or plastic formulation by mixing and/or blending at least one polymer component with at least one additive, for example the calcium carbonate-comprising filler material in a molten or softened state in order to achieve a homogenous blend of the different raw materials. The dispersive and distributive mixing is performed at temperatures at which the polymer components are in a molten or softened state but below decomposition temperature. Compounding methods are known to the skilled person, for example, the compounding may be done by extrusion, for example with a twin screw extruder or a co-kneader.

As used herein the term "polymer" generally includes homopolymers and copolymers such as, for example, block, graft, random and alternating copolymers, as well as blends and modifications thereof. The polymer can be an amorphous polymer, a crystalline polymer, or a semi-crystalline polymer, i.e. a polymer comprising crystalline and amorphous fractions. The degree of crystallinity is specified in percent and can be determined by differential scanning calorimetry (DSC). An amorphous polymer may be characterized by its glass transition temperature and a crystalline polymer may be characterized by its melting point. A semi-crystalline polymer may be characterized by its glass transition temperature and/or its melting point.

The term "glass transition temperature" in the meaning of the present invention refers to the temperature at which the glass transition occurs, which is a reversible transition in amorphous materials (or in amorphous regions within semi-crystalline materials) from a hard and relatively brittle state into a molten or rubber-like state. The glass-transition temperature is always lower than the melting point of the crystalline state of the material, if one exists. The term "melting point" in the meaning of the present invention refers to the temperature at which a solid changes state from solid to liquid at atmospheric pressure. At the melting point the solid and liquid phase exist in equilibrium. Glass-transition temperature and melting point are determined by ISO 11357 with a heating rate of 10° C./min.

The term "bio-degradable" polymer refers to a polymer that is capable of being broken down and disposed of with the help of bacteria or other living organisms, e.g. fungi.

The term "polymer composition" according to the present invention refers to a composition comprising at least one polylactic acid as polymer component and at least one calcium carbonate-comprising material as filler.

The term "polylactic acid" according to the present invention refers to polymers that comprise Formula I as repeating unit

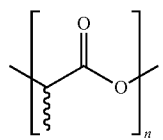

Formula (I)

Lactic acid is chiral and, therefore, refers to two optical isomers. One is known as L-(+)-lactic acid or (S)-lactic acid and the other, its mirror image, is D-(−)-lactic acid or (R)-lactic acid. A mixture of the two in equal amounts is called DL-lactic acid, or racemic lactic acid. Due to this chirality different types of polylactic acid are known, for example, PLLA (Poly-L-lactic Acid), PDLA (Poly-D-lactic Acid), and PDLLA (Poly-DL-lactic Acid).

For the purpose of the present invention, the term "calcium carbonate-comprising filler material" or "calcium carbonate-comprising material" refers to a material that comprises at least 60 wt.-% and preferably at least 80 wt.-% calcium carbonate, based on the total dry weight of the calcium carbonate-comprising filler material.

"Ground calcium carbonate" (GCC) in the meaning of the present invention is a calcium carbonate obtained from natural sources, such as limestone, marble, or chalk, and processed through a wet and/or dry treatment such as grinding, screening and/or fractionation, for example, by a cyclone or classifier.

"Precipitated calcium carbonate" (PCC) in the meaning of the present invention is a synthesized material, generally obtained by precipitation following a reaction of carbon dioxide and calcium hydroxide (hydrated lime) in an aqueous environment or by precipitation from a calcium and a carbonate source in water. Additionally, precipitated calcium carbonate can also be the product of introducing calcium and carbonate salts, calcium chloride and sodium carbonate for example, in an aqueous environment. PCC may have a vateritic, calcitic or aragonitic crystalline form. PCCs are described, for example, in EP 2 447 213 A1, EP 2 524 898 A1, EP 2 371 766 A1, EP 2 840 065 A1, or WO 2013/142473 A1.

The term "dry" or "dried" material is understood to be a material having between 0.001 to 0.5 wt.-% of water, based on the total weight of the calcium carbonate-comprising material weight. The % water (equal to "moisture content") is determined gravimetrically. "Drying" in the sense of the present invention means that heating is carried out until the moisture content of the calcium carbonate-comprising material is in the range from 0.001 to 0.5% by weight, based on the total weight of the calcium carbonate-comprising material weight.

The "particle size" of particulate materials, for example the calcium carbonate-comprising material herein is described by its distribution of particle sizes $d_x$.

Therein, the value $d_x$ represents the diameter relative to which x % by weight of the particles have diameters less than $d_x$. This means that, for example, the $d_{20}$ value is the particle size at which 20 wt.-% of all particles are smaller than that particle size. The $d_{50}$ value is thus the weight median particle size, i.e. 50 wt.-% of all grains are bigger and the remaining 50 wt.-% are smaller than this particle size. For the purpose of the present invention the particle size is specified as weight median particle size $d_{50}$ unless indicated otherwise. The $d_{98}$ value is the particle size at which 98 wt.-% of all particles are smaller than that particle size. The $d_{98}$ value is also designated as "top cut". Particle sizes were determined by using a Sedigraph™5100 or 5120 instrument of Micromeritics Instrument Corporation. The method and the instrument are known to the skilled person and are commonly used to determine the particle size of fillers and pigments. The measurements were carried out in an aqueous solution of 0.1 wt.-% $Na_4P_2O_7$. The samples were dispersed using a high speed stirrer and sonicated.

A "specific surface area (SSA)" of a calcium carbonate-comprising material in the meaning of the present invention is defined as the surface area of the calcium carbonate-comprising material divided by its mass. As used herein, the specific surface area is measured by nitrogen gas adsorption using the BET isotherm (ISO 9277:2010) and is specified in $m^2/g$.

For the purpose of the present invention, the term "viscosity" or "Brookfield viscosity" refers to Brookfield viscosity. The Brookfield viscosity is for this purpose measured by a Brookfield DV-III Ultra viscometer at 24° C.±3° C. at 100 rpm using an appropriate spindle of the Brookfield RV-spindle set and is specified in mPa·s. Once the spindle has been inserted into the sample, the measurement is started with a constant rotating speed of 100 rpm. The reported Brookfield viscosity values are the values displayed 60 seconds after the start of the measurement. Based on his technical knowledge, the skilled person will select a spindle from the Brookfield RV-spindle set which is suitable for the viscosity range to be measured. For example, for a viscosity range between 200 and 800 mPa·s the spindle number 3 may be used, for a viscosity range between 400 and 1 600 mPa·s the spindle number 4 may be used, for a viscosity range between 800 and 3 200 mPa·s the spindle number 5 may be used, for a viscosity range between 1 000 and 2 000 000 mPa·s the spindle number 6 may be used, and for a viscosity range between 4 000 and 8 000 000 mPa·s the spindle number 7 may be used.

For the purpose of the present application, "water-insoluble" materials are defined as materials which, when 100 g of said material is mixed with 100 g deionised water and filtered on a filter having a 0.2 μm pore size at 20° C. to recover the liquid filtrate, provide less than or equal to 0.1 g of recovered solid material following evaporation at 95 to 100° C. of 100 g of said liquid filtrate at ambient pressure. "Water-soluble" materials are defined as materials which, when 100 g of said material is mixed with 100 g deionised water and filtered on a filter having a 0.2 μm pore size at 20° C. to recover the liquid filtrate, provide more than 0.1 g of recovered solid material following evaporation at 95 to 100° C. of 100 g of said liquid filtrate at ambient pressure.

A "suspension" or "slurry" in the meaning of the present invention comprises insoluble solids and a solvent or liquid, preferably water, and optionally further additives, and usually contains large amounts of solids and, thus, is more viscous and can be of higher density than the liquid from which it is formed.

For the purpose of the present invention, the "solids content" of a liquid composition is a measure of the amount of material remaining after all the solvent or water has been evaporated.

The "melt flow rate" or "MFR", "melt mass flow rate", "melt flow index" or "melt index" according to the present invention is the measure of the ease of flow of melted plastic and is expressed in g/10 min. Typical melt flow instruments are compact and easy to use and known to the skilled person. According to the present invention the melt flow rate is measure according to DIN EN ISO 1133-1:2011 by using procedure A. The polymer composition in the shape of granules is made fluid by heating up to 210° C. and forced to flow out of a cylinder through a capillary die having an inner diameter of 2.095 mm and a length of 8 mm. The extruding piston is loaded with dead weights at 2.16 kg. The MFR is obtained under standard conditions.

The "tensile strain at break" or the "ultimate tensile strength" according to the present invention is a measure of the force per unit area (MPa or psi) required to break a material in such a manner. Typical instruments for measuring the tensile strain at break are known to the skilled person. The tensile strain at break can be measured according to DIN EN ISO 527:2012 but also other test methods are available. According to the present invention the tensile strain at break is measured according to DIN EN ISO 527-2/1BA/50:2012, which means that the sample is pulled apart in the test with a speed of 50 mm/min. The test specimen of the present invention have the geometry 1BA with the exception that the thickness of the samples is between 1.9±2 mm and the measuring length is 25×5 mm. The tensile strain at break is obtained under standard conditions.

The term "standard conditions" according to the present invention refers to standard ambient temperature and pressure (SATP) which refers to a temperature of 298.15 K (25° C.) and an absolute pressure of exactly 100000 Pa (1 bar, 14.5 psi, 0.98692 atm).

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" even though such a limited understanding is always included by the terms "obtained" or "defined" as a preferred embodiment.

According to the present invention it has been found mono-substituted succinic anhydride may be used before or during compounding of a polymer composition to improve the stability especially the thermal stability of a polymer composition comprising polylactic acid as polymer component and calcium carbonate-comprising material as filler and/or to facilitate the processability of such a polymer composition and/or to improve the mechanical properties, especially the melt flow rate of such polymer composition. Thus, according to the present invention the use of at least one mono-substituted succinic anhydride before or during compounding of a polymer composition comprising polylactic acid as polymer component and at least one calcium carbonate-comprising material as filler, to reduce the polymer decomposition during processing and/or to decrease the melt flow rate of such a compounded polymer composition by at least 10%, measured according to DIN EN ISO 1133-1:2011 (procedure A, 2.16 kg, 210° C., granules), in comparison to the same polymer composition that has been treated the same way without at least one mono-substituted succinic anhydride is provided.

In the following the details and preferred embodiments of the inventive use of the mono-substituted succinic anhydride before or during compounding of a polymer composition as claimed in claim 1 will be set out in more detail.

The polymer composition according to the present invention comprises polylactic acid as polymer component and at least one calcium carbonate-comprising material as filler.

The at Least One Calcium Carbonate-Comprising Material

The polymer composition of the present invention comprises at least one calcium carbonate-comprising material as filler.

The expression "at least one" calcium carbonate-comprising material means that one or more, for example, two or three calcium carbonate-comprising materials may be present in the polymer composition. According to a preferred embodiment only one calcium carbonate-comprising material is present in the polymer composition.

According to a preferred embodiment of the present invention the calcium carbonate-comprising material is selected from the group consisting of ground calcium carbonate (GCC), preferably marble, limestone, dolomite and/or chalk, precipitated calcium carbonate, preferably vaterite, calcite and/or aragonite, and mixtures thereof, more preferably the at least one calcium carbonate-comprising material is ground calcium carbonate.

Natural or ground calcium carbonate (GCC) is understood to be manufactured from a naturally occurring form of calcium carbonate, mined from sedimentary rocks such as limestone or chalk, or from metamorphic marble rocks, eggshells or seashells. Calcium carbonate is known to exist as three types of crystal polymorphs: calcite, aragonite and vaterite. Calcite, the most common crystal polymorph, is considered to be the most stable crystal form of calcium carbonate. Less common is aragonite, which has a discrete or clustered needle orthorhombic crystal structure. Vaterite is the rarest calcium carbonate polymorph and is generally unstable. Ground calcium carbonate is almost exclusively of the calcitic polymorph, which is said to be trigonal-rhombohedral and represents the most stable form of the calcium carbonate polymorphs. The term "source" of the calcium carbonate in the meaning of the present application refers to the naturally occurring mineral material from which the calcium carbonate is obtained. The source of the calcium carbonate may comprise further naturally occurring components such as magnesium carbonate, alumino silicate etc.

In general, the grinding of natural ground calcium carbonate may be a dry or wet grinding step and may be carried out with any conventional grinding device, for example, under conditions such that comminution predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case the calcium carbonate-comprising mineral material comprises a wet ground calcium carbonate-comprising mineral material, the grinding step may be performed under conditions such that autogenous grinding takes place and/or by horizontal ball milling, and/or other such processes known to the skilled man. The wet processed ground calcium carbonate-comprising mineral material thus obtained may be washed and dewatered by well-known processes, e.g. by flocculation, filtration or forced evaporation prior to drying. The subsequent step of drying (if necessary) may be carried out in a single step such as spray drying, or in at least two steps. It is also common that such a mineral material undergoes a beneficiation step (such as a flotation, bleaching or magnetic separation step) to remove impurities.

According to one embodiment of the present invention the source of natural or ground calcium carbonate (GCC) is selected from marble, chalk, limestone, dolomite or mixtures thereof. Preferably, the source of ground calcium carbonate is marble, and more preferably dolomitic marble and/or magnesitic marble. According to one embodiment of the present invention the GCC is obtained by dry grinding.

According to another embodiment of the present invention the GCC is obtained by wet grinding and subsequent drying.

"Dolomite" in the meaning of the present invention is a calcium carbonate-comprising mineral, namely a carbonic calcium-magnesium-mineral, having the chemical composition of $CaMg(CO_3)_2$ ("$CaCO_3.MgCO_3$"). A dolomite mineral may contain at least 30.0 wt.-% $MgCO_3$, based on the total weight of dolomite, preferably more than 35.0 wt.-%, and more preferably more than 40.0 wt.-% $MgCO_3$.

According to one embodiment of the present invention, the calcium carbonate comprises one type of ground calcium carbonate. According to another embodiment of the present invention, the calcium carbonate comprises a mixture of two or more types of ground calcium carbonates selected from different sources.

"Precipitated calcium carbonate" (PCC) in the meaning of the present invention is a synthesized material, generally obtained by precipitation following reaction of carbon dioxide and lime in an aqueous environment or by precipitation of a calcium and carbonate ion source in water or by precipitation by combining calcium and carbonate ions, for example $CaCl_2$ and $Na_2CO_3$, out of solution. Further possible ways of producing PCC are the lime soda process, or the Solvay process in which PCC is a by-product of ammonia production. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like form. Vaterite belongs to the hexagonal crystal system. The obtained PCC slurry can be mechanically dewatered and dried.

According to one embodiment of the present invention, the precipitated calcium carbonate is precipitated calcium carbonate, preferably comprising aragonitic, vateritic or calcitic mineralogical crystal forms or mixtures thereof.

According to one embodiment of the present invention, the calcium carbonate comprises one type of precipitated calcium carbonate. According to another embodiment of the present invention, the calcium carbonate comprises a mixture of two or more precipitated calcium carbonates selected from different crystalline forms and different polymorphs of precipitated calcium carbonate. For example, the at least one precipitated calcium carbonate may comprise one PCC selected from S-PCC and one PCC selected from R-PCC.

According to a preferred embodiment of the present invention the at least one calcium carbonate-comprising material is ground calcium carbonate, preferably dry ground calcium carbonate. According to another preferred embodiment, the at least one calcium carbonate-comprising material is marble.

It is appreciated that the amount of calcium carbonate in the at least one calcium carbonate-comprising filler material is at least 60 wt.-%, preferably at least 80 wt.-%, e.g. at least 95 wt.-%, more preferably between 97 and 100 wt.-%, and even more preferably between 98.5 and 99.95 wt.-%, based on the total dry weight of the at least one calcium carbonate-comprising filler material.

The at least one calcium carbonate-comprising filler material is preferably in the form of a particulate material, and may have a particle size distribution as conventionally employed for the material(s) involved in the type of product to be produced. According to one embodiment of the present invention the at least one calcium carbonate-comprising filler material has a weight median particle size $d_{50}$ value in the range from 0.1 to 10 μm. For example, the at least one calcium carbonate-comprising filler material has a weight median particle size $d_{50}$ from 0.5 μm to 5 μm and preferably from 0.7 μm to 4 μm.

According to one embodiment of the present invention the at least one calcium carbonate-comprising material, preferably the ground calcium carbonate, may have a top cut ($d_{98}$) of ≤15 μm. For example, the at least one calcium carbonate-comprising material may have a top cut ($d_{98}$) of ≤12.5 μm, preferably of ≤10 μm and most preferably of ≤7.5 μm.

According to another embodiment of the present invention the specific surface area of the ground calcium carbonate and/or the precipitated calcium carbonate is from 0.5 and 150 $m^2/g$, preferably from 1 to 60 $m^2/g$ and most preferably from 1.5 to 15 $m^2/g$ as measured using nitrogen and the BET method according to ISO 9277:2010.

Depending on the at least one calcium carbonate-comprising filler material, the at least one calcium carbonate-comprising filler material according to one embodiment may have a residual total moisture content of from 0.01 to 1 wt.-%, preferably from 0.02 to 0.5 wt.-%, more preferably from 0.03 to 0.3 wt.-% and most preferably from 0.04 to 0.15 wt.-%, based on the total dry weight of the at least one calcium carbonate-comprising filler material.

For example, in case a wet ground and dried calcium carbonate is used as the at least one calcium carbonate-comprising filler material, the residual total moisture content of the at least one calcium carbonate-comprising filler material is preferably of from 0.01 to 1 wt.-%, more preferably from 0.02 to 0.1 wt.-% and most preferably from 0.04 to 0.08 wt.-% based on the total dry weight of the at least one calcium carbonate-comprising filler material. If a PCC is used as the at least one calcium carbonate-comprising filler material, the residual total moisture content of the at least one calcium carbonate-comprising filler material is preferably of from 0.01 to 1 wt.-%, more preferably from 0.05 to 0.2 wt.-% and most preferably from 0.05 to 0.15 wt.-%, based on the total dry weight of the at least one calcium carbonate-comprising filler material.

According to one embodiment of the present invention the calcium carbonate-comprising material has a weight median particle size $d_{50}$ value in the range from 0.1 μm to 10 μm, preferably in the range from 0.25 μm to 7 μm, more preferably in the range from 0.5 μm to 5 μm and most preferably in the range from 0.7 μm to 4 μm and a top cut ($d_{98}$) of ≤15 μm, preferably of ≤12.5 μm, more preferably of ≤10 μm and most preferably of ≤7.5 μm and a specific surface area (BET) of from 0.5 to 150 $m^2/g$ as measured using nitrogen and the BET method according to ISO 9277:2010, preferably from 1 to 60 $m^2/g$, and more preferably from 1.5 to 15 $m^2/g$ and a residual total moisture content of from 0.01 wt.-% to 1 wt.-%, based on the total dry weight of the at least one calcium carbonate-comprising material, preferably from 0.02 wt.-% to 0.5 wt.-%, more preferably from 0.03 wt.-% to 0.3 wt.-%, and most preferably from 0.04 wt.-% to 0.15 wt.-%.

According to embodiment of the present invention, the at least one calcium carbonate-comprising filler material is a dry ground calcium carbonate, preferably a marble, having a median particle size diameter $d_{50}$ value from 0.1 μm to 10 μm, preferably from 0.25 μm to 7 μm, more preferably from 0.5 μm to 5 μm and most preferably from 0.7 μm to 4 μm and a BET specific surface area of from 0.5 to 150 $m^2/g$, preferably of from 1 to 60 $m^2/g$, more preferably of from 1.5 to 15 $m^2/g$, measured using nitrogen and the BET method according to ISO 9277.

According to a preferred embodiment of the present invention, the at least one calcium carbonate-comprising filler material is a dry ground calcium carbonate, preferably a marble, having a median particle size diameter $d_{50}$ value from 0.7 μm to 4 μm, for example 2.6 μm and a BET specific surface area of from 1.5 to 15 $m^2/g$, for example 2.6 $m^2/g$, measured using nitrogen and the BET method according to ISO 9277.

According to one embodiment of the present invention a further surface coating is present on the surface of the calcium carbonate-comprising material.

The Polylactic Acid

The polymer composition of the present invention comprises at polylactic acid as polymer component.

The term "polylactic acid" according to the present invention refers to polymers that comprise Formula I as repeating unit

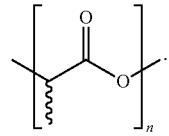

Formula (I)

Lactic acid having the chemical formula $CH_3CH(OH)CO_2H$ is an organic compound which is a white, water-soluble solid or clear liquid that is produced both naturally and synthetically. Lactic acid is chiral and, therefore, refers to two optical isomers. One is known as L-(+)-lactic acid or (S)-lactic acid and the other, its mirror image, is D-(−)-lactic acid or (R)-lactic acid. A mixture of the two in equal amounts is called DL-lactic acid, or racemic lactic acid. Lactic acid is hygroscopic. DL-lactic acid is miscible with water and with ethanol above its melting point which is around 17 to 18° C. D-lactic acid and L-lactic acid have a higher melting point of 53° C. Lactic acid is known to the skilled person and commercially available, for example, from Sigma Aldrich, Caesar & Loretz GmbH, NatureWorks under the trade name Biopolymer 2003D or other known suppliers.

There are several industrial routes to produce polylactic acid (PLA) which are known to the skilled person. In general, two main monomers are used for producing PLA. Option 1 is the ring-opening polymerization of the cyclic di-ester lactide with various metal catalysts in solution, in the melt, or as a suspension. The metal-catalyzed reaction tends to cause racemization of the PLA, reducing its stereo-regularity compared to the starting material (usually corn starch). Another route for producing PLA is the direct condensation of lactic acid monomers below temperatures of 200° C. However, this reaction generates one equivalent of water for every condensation (esterification) step, which is undesirable because water causes chain-transfer leading to low molecular weight material. The direct condensation is thus preferably performed in a stepwise fashion, where lactic acid is first oligomerized to PLA oligomers. Thereafter, polycondensation is done in the melt or as a solution, where short oligomeric units are combined to give a high molecular weight polymer strand. Water removal by application of a vacuum or by azeotropic distillation is crucial to favor polycondensation over transesterification. Methods and processes for producing polylactic acid are, for example, disclosed in U.S. Pat. No. 7,507,561, in EP 2 607 399 or in WO 2004/057008.

Due to the chirality of lactic acid different types of polylactic acid are known, for example, PLLA (Poly-L-lactic Acid), PDLA (Poly-D-lactic Acid), and PDLLA (Poly-DL-lactic Acid). According to one embodiment of the present invention the polylactic acid is PLLA. According to another embodiment of the present invention the polylactic acid is PDLA. According to another embodiment of the present invention the polylactic acid is PDLLA. According to one embodiment, the polylactic acid may consist of only one specific type of PLA or a mixture of two or more types of PLA. For example, the polylactic acid may consist of a mixture of PLLA and PDLLA. According to a preferred embodiment the polylactic acid consist of only one specific type of PLA. The polylactic acid may be, for example, PDLLA comprising between 1 to 10 wt.-%, preferably between 4 to 6 wt.-% of D isomers, based on the total weight of the polylactic acid. Polylactic acid is commercially available, for example from NatureWorks under the trade name Biopolymer 2003D.

According to one embodiment of the present invention the polylactic acid is a copolymer of polylactic acid and at least one sort of further monomers. For example, the polylactic acid is a copolymer of polylactic acid and polyethylene glycol.

According to a preferred embodiment the polylactic acid is a homopolymer and, therefore, consist only of the repeating unit of Formula I above.

Depending on its processing and thermal history, PLA may exist both as an amorphous and as a semi-crystalline polymer, i.e. as a polymer comprising crystalline and amorphous fractions. The semi-crystalline material can appear transparent or opaque and white depending on its crystal structure and particle size.

According to one embodiment, the PLA is amorphous. According to another embodiment, the PLA is semi-crystalline, preferably the PLA has a degree of crystallinity of at least 20%, more preferably of at least 40%, and most preferably of at least 50%. According to still another embodiment, the PLA has a degree of crystallinity from 10 to 80%, more preferably from 20 to 70%, and most preferably from 30 to 60%. The degree of crystallinity may be measured with differential scanning calorimetry (DSC).

According to one embodiment of the present invention, the PLA has an intrinsic viscosity, from 2 to 8 dl/g, preferably from 2.2 to 6 dl/g, and more preferably from 2.8 to 4 dl/g. The term "intrinsic viscosity" as used in the context of the present invention is a measure of the capability of a polymer in solution to enhance the viscosity of the solution and is specified in dl/g.

According to another embodiment of the present invention, the PLA has a glass transition temperature, $T_g$, from 35 to 90° C., preferably from 40 to 70° C., and more preferably from 45 to 65° C.

According to one embodiment of the present invention, the PLA has a number average molecular weight from 5000 to 200000 g/mol, preferably from 10000 to 100000 g/mol, and more preferably from 15000 to 80000 g/mol.

According to one embodiment of the present invention, the PLA has a specific gravity, from 0.5 to 5, preferably from 0.7 to 4, and more preferably from 1 to 3. The term "specific gravity" according to the present invention is the ratio of the density of the PLA to the density of a reference substance; equivalently, it is the ratio of the mass of PLA to the mass of a reference substance for the same given volume. The reference substance is water.

According to a preferred embodiment of the present invention the polylactic acid is PDLLA comprising between 4 to 6 wt.-% of D isomers, based on the total weight of the polylactic acid. Furthermore, the PDLLA has a specific gravity from 1 to 3 and a glass transition temperature from 45 to 65° C.

The Polymer Composition

The polymer composition according to the present invention comprises polylactic acid as polymer component and at least one calcium carbonate-comprising material as filler.

According to one embodiment of the present invention the calcium carbonate-comprising material is present in the polymer composition in an amount from 0.1 to 85 wt.-%, based on the total weight of the polymer component, preferably in an amount from 3 to 50 wt.-%, more preferably in an amount from 5 to 40 wt.-%, and most preferably in an amount from 10 to 30 wt.-%.

According to another embodiment of the present invention, the polymer composition may comprise further additives such as colouring pigments, dyes, waxes, lubricants, oxidative- and/or UV-stabilizers, antioxidants and other fillers, such as talc. Such additives are known to the skilled person and are commercially available.

According to another embodiment of the present invention the polymer composition comprises further polymer components. For example, the polymer composition may comprise further polyesters, starch or starch derivatives, polycaprolactone (PCL), cellulose based polymers like cellulose acetate, polyglycols, polyvinly acetate, polyolefins (with compatibilizer), polyacetals, poly(meth)acrylates, polycarbonate, high rubber content ABS (50-85% rubber) or mixtures thereof.

Polyesters are a class of polymers which contain the ester functional group in their main chain and are generally obtained by a polycondensation reaction. Polyesters may include naturally occurring polymers such as cutin as well as synthetic polymers such as polycarbonate or poly butyrate. Depending on their structure polyesters may be bio-degradable. The term "bio-degradable" within the meaning of the present invention relates to a substance or object capable of being broken down or decomposed with the help of bacteria or other living organisms and thereby avoiding environmental pollution.

According to one embodiment, the polyester is selected form the group consisting of a polyglycolic acid, a polycaprolactone, a polyethylene adipate, a polybutylene adipate, a polyhydroxyalkanoate (PHA), a polyhydroxybutyrate, a polyalkylene terephthalate, a polyethylene terephthalate, a polytrimethylene terephthalate, a polybutylene terephthalate, a polyethylene naphthalate, or a mixture thereof, or copolymers thereof. Copolymers thereof may be, for example, poly(butylene adipate-co-terephthalate) (PBAT). Any of these polymers may be in pure form, i.e. in form of a homopolymer, or may be modified by copolymerization and/or by adding one or more substituents to the main chain or side chains of the main chain.

According to one embodiment of the present invention, the polymer composition comprises polylactic acid as polymer component and at least one further polymer component, for example, one or two or three further polymer components. If the polymer composition comprises further polymer components apart from polylactic acid it is preferred that these polymers are bio-degradable.

According to one embodiment of the present invention the ratio of the polylactic acid to the further polymer components present in the polymer composition is from 99:1 to 20:80, preferably from 95:5 to 50:50 and most preferably from 90:10 to 60:40, based on the weight of the polymer components.

According to a preferred embodiment the polymer component consists only of polylactic acid. This means that the polymer composition comprises polylactic acid as only polymer component and, therefore, no further polymer components are present in the polymer composition.

According to another preferred embodiment of the present invention the polymer composition consists only of polymer components and calcium carbonate-comprising filler material. For example, the polymer composition may consist of polylactic acid as polymer component, one further polymer component and the calcium carbonate-comprising filler material. According to a preferred embodiment of the present invention the polymer composition consists only of polylactic acid as polymer component and at least one calcium carbonate-comprising material as filler.

The at Least One Mono-Substituted Succinic Anhydride

According to the present invention at least one mono-substituted succinic anhydride is used.

It is appreciated that the expression "at least one" mono-substituted succinic anhydride means that one or more kinds of mono-substituted succinic anhydride may be provided in the process of the present invention.

Accordingly, it should be noted that the at least one mono-substituted succinic anhydride may be one kind of mono-substituted succinic anhydride. Alternatively, the at least one mono-substituted succinic anhydride may be a mixture of two or more kinds of mono-substituted succinic anhydride. For example, the at least one mono-substituted succinic anhydride may be a mixture of two or three kinds of mono-substituted succinic anhydride, like two kinds of mono-substituted succinic anhydride.

In one embodiment of the present invention, the at least one mono-substituted succinic anhydride consist only of one mono-substituted succinic anhydride.

According to one embodiment of the present invention the at least one mono-substituted succinic anhydride consists of succinic anhydride mono-substituted with a group selected from any linear, branched, aliphatic and cyclic group having a total amount of carbon atoms from C2 to C30 and in case of branched groups C3-C30 in the substituent.

In one embodiment of the present invention, the at least one mono-substituted succinic anhydride consists of succinic anhydride mono-substituted with a group selected from a linear, branched, aliphatic and cyclic group having a total amount of carbon atoms from C3 to C25 in the substituent. For example, the at least one mono-substituted succinic anhydride consists of succinic anhydride mono-substituted with a group selected from a linear, branched, aliphatic and cyclic group having a total amount of carbon atoms from C4 to C20 in the substituent.

In one embodiment of the present invention, the at least one mono-substituted succinic anhydride consists of succinic anhydride mono-substituted with one group being a linear and aliphatic group having a total amount of carbon atoms from C2 to C30, preferably from C3 to C25 and most preferably from C4 to C20 in the substituent. Additionally or alternatively, the at least one mono-substituted succinic anhydride consists of succinic anhydride mono-substituted with one group being a branched and aliphatic group having a total amount of carbon atoms from C3 to C30, preferably from C3 to C25 and most preferably from C4 to C20 in the substituent.

Thus, it is preferred that the at least one mono-substituted succinic anhydride consists of succinic anhydride mono-substituted with one group being a linear or branched, alkyl group having a total amount of carbon atoms from C2 to C30 and in case of branched groups C3-C30, preferably from C3 to C25 and most preferably from C4 to C20 in the substituent.

For example, the at least one mono-substituted succinic anhydride consists of succinic anhydride mono-substituted with one group being a linear alkyl group having a total amount of carbon atoms from C2 to C30, preferably from C3 to C25 and most preferably from C4 to C20 in the substituent. Additionally or alternatively, the at least one mono-substituted succinic anhydride consists of succinic anhydride mono-substituted with one group being a branched alkyl group having a total amount of carbon atoms from C3 to C30, preferably from C3 to C25 and most preferably from C4 to C20 in the substituent.

The term "alkyl" in the meaning of the present invention refers to a linear or branched, saturated organic compound composed of carbon and hydrogen. In other words, "alkyl mono-substituted succinic anhydrides" are composed of linear or branched, saturated hydrocarbon chains containing a pendant succinic anhydride group.

In one embodiment of the present invention, the at least one mono-substituted succinic anhydride is at least one linear or branched alkyl mono-substituted succinic anhydride. For example, the at least one alkyl mono-substituted succinic anhydride is selected from the group comprising ethylsuccinic anhydride, propylsuccinic anhydride, butylsuccinic anhydride, triisobutyl succinic anhydride, pentylsuccinic anhydride, hexylsuccinic anhydride, heptylsuccinic anhydride, octylsuccinic anhydride, nonylsuccinic anhydride, decyl succinic anhydride, dodecyl succinic anhydride, hexadecanyl succinic anhydride, octadecanyl succinic anhydride, and mixtures thereof.

Accordingly, it is appreciated that e.g. the term "butylsuccinic anhydride" comprises linear and branched butylsuccinic anhydride(s). One specific example of linear butylsuccinic anhydride(s) is n-butylsuccinic anhydride. Specific examples of branched butylsuccinic anhydride(s) are iso-butylsuccinic anhydride, sec-butylsuccinic anhydride and/or tert-butylsuccinic anhydride.

Furthermore, it is appreciated that e.g. the term "hexadecanyl succinic anhydride" comprises linear and branched hexadecanyl succinic anhydride(s). One specific example of linear hexadecanyl succinic anhydride(s) is n-hexadecanyl succinic anhydride. Specific examples of branched hexadecanyl succinic anhydride(s) are 14-methylpentadecanyl succinic anhydride, 13-methylpentadecanyl succinic anhydride, 12-methylpentadecanyl succinic anhydride, 11-methylpentadecanyl succinic anhydride, 10-methylpentadecanyl succinic anhydride, 9-methylpentadecanyl succinic anhydride, 8-methylpentadecanyl succinic anhydride, 7-methylpentadecanyl succinic anhydride, 6-methylpentadecanyl succinic anhydride, 5-methylpentadecanyl succinic anhydride, 4-methylpentadecanyl succinic anhydride, 3-methylpentadecanyl succinic anhydride, 2-methylpentadecanyl succinic anhydride, 1-methylpentadecanyl succinic anhydride, 13-ethylbutadecanyl succinic anhydride, 12-ethylbutadecanyl succinic anhydride, 11-ethylbutadecanyl succinic anhydride, 10-ethylbutadecanyl succinic anhydride, 9-ethylbutadecanyl succinic anhydride, 8-ethylbutadecanyl succinic anhydride, 7-ethylbutadecanyl succinic anhydride, 6-ethylbutadecanyl succinic anhydride, 5-ethylbutadecanyl succinic anhydride, 4-ethylbutadecanyl succinic anhydride, 3-ethylbutadecanyl succinic anhydride, 2-ethylbutadecanyl succinic anhydride, 1-ethylbutadecanyl succinic anhydride, 2-butyldodecanyl succinic anhydride, 1-hexyldecanyl succinic anhydride, 1-hexyl-2-decanyl succinic anhydride, 2-hexyldecanyl succinic anhydride, 6,12-dimethylbutadecanyl succinic anhydride, 2,2-diethyldodecanyl succinic anhydride, 4,8,12-trimethyltridecanyl succinic anhydride, 2,2,4,6,8-pentamethylundecanyl succinic anhydride, 2-ethyl-4-methyl-2-(2-methylpentyl)-heptyl succinic anhydride and/or 2-ethyl-4,6-dimethyl-2-propylnonyl succinic anhydride.

Furthermore, it is appreciated that e.g. the term "octadecanyl succinic anhydride" comprises linear and branched octadecanyl succinic anhydride(s). One specific example of linear octadecanyl succinic anhydride(s) is n-octadecanyl succinic anhydride. Specific examples of branched hexadecanyl succinic anhydride(s) are 16-methylheptadecanyl succinic anhydride, 15-methylheptadecanyl succinic anhydride, 14-methylheptadecanyl succinic anhydride, 13-methylheptadecanyl succinic anhydride, 12-methylheptadecanyl succinic anhydride, 11-methylheptadecanyl succinic anhydride, 10-methylheptadecanyl succinic anhydride, 9-methylheptadecanyl succinic anhydride, 8-methylheptadecanyl succinic anhydride, 7-methylheptadecanyl succinic anhydride, 6-methylheptadecanyl succinic anhydride, 5-methylheptadecanyl succinic anhydride, 4-methylheptadecanyl succinic anhydride, 3-methylheptadecanyl succinic anhydride, 2-methylheptadecanyl succinic anhydride, 1-methylheptadecanyl succinic anhydride, 14-ethylhexadecanyl succinic anhydride, 13-ethylhexadecanyl succinic anhydride, 12-ethylhexadecanyl succinic anhydride, 11-ethylhexadecanyl succinic anhydride, 10-ethylhexadecanyl succinic anhydride, 9-ethylhexadecanyl succinic anhydride, 8-ethylhexadecanyl succinic anhydride, 7-ethylhexadecanyl succinic anhydride, 6-ethylhexadecanyl succinic anhydride, 5-ethylhexadecanyl succinic anhydride, 4-ethylhexadecanyl succinic anhydride, 3-ethylhexadecanyl succinic anhydride, 2-ethylhexadecanyl succinic anhydride, 1-ethylhexadecanyl succinic anhydride, 2-hexyldodecanyl succinic anhydride, 2-heptylundecanyl succinic anhydride, iso-octadecanyl succinic anhydride and/or 1-octyl-2-decanyl succinic anhydride.

In one embodiment of the present invention, the at least one alkyl mono-substituted succinic anhydride is selected from the group comprising butylsuccinic anhydride, hexylsuccinic anhydride, heptylsuccinic anhydride, octylsuccinic anhydride, hexadecanyl succinic anhydride, octadecanyl succinic anhydride, and mixtures thereof.

In one embodiment of the present invention, the at least one mono-substituted succinic anhydride is one kind of alkyl mono-substituted succinic anhydride. For example, the one alkyl mono-substituted succinic anhydride is butylsuccinic anhydride. Alternatively, the one alkyl mono-substituted succinic anhydride is hexylsuccinic anhydride. Alternatively, the one alkyl mono-substituted succinic anhydride is heptylsuccinic anhydride or octylsuccinic anhydride. Alternatively, the one alkyl mono-substituted succinic anhydride is hexadecanyl succinic anhydride. For example, the one alkyl mono-substituted succinic anhydride is linear hexadecanyl succinic anhydride such as n-hexadecanyl succinic anhydride or branched hexadecanyl succinic anhydride such as 1-hexyl-2-decanyl succinic anhydride. Alternatively, the one alkyl mono-substituted succinic anhydride is octadecanyl succinic anhydride. For example, the one alkyl mono-substituted succinic anhydride is linear octadecanyl succinic anhydride such as n-octadecanyl succinic anhydride or branched octadecanyl succinic anhydride such as iso-octadecanyl succinic anhydride or 1-octyl-2-decanyl succinic anhydride.

In one embodiment of the present invention, the one alkyl mono-substituted succinic anhydride is butylsuccinic anhydride such as n-butylsuccinic anhydride.

In one embodiment of the present invention, the at least one mono-substituted succinic anhydride is a mixture of two or more kinds of alkyl mono-substituted succinic anhydrides. For example, the at least one mono-substituted succinic anhydride is a mixture of two or three kinds of alkyl mono-substituted succinic anhydrides.

In one embodiment of the present invention, the at least one mono-substituted succinic anhydride consists of succinic anhydride mono-substituted with one group being a linear or branched alkenyl group having a total amount of carbon atoms from C2 to C30 and in case of branched groups C3-C30, preferably from C3 to C25 and most preferably from C4 to C20 in the substituent.

The term "alkenyl" in the meaning of the present invention refers to a linear or branched, unsaturated organic compound composed of carbon and hydrogen. Said organic compound further contains at least one double bond in the substituent, preferably one double bond. In other words, "alkenyl mono-substituted succinic anhydrides" are composed of linear or branched, unsaturated hydrocarbon chains containing a pendant succinic anhydride group. It is appreciated that the term "alkenyl" in the meaning of the present invention includes the cis and trans isomers.

In one embodiment of the present invention, the at least one mono-substituted succinic anhydride is at least one linear or branched alkenyl mono-substituted succinic anhydride. For example, the at least one alkenyl mono-substituted succinic anhydride is selected from the group comprising ethenylsuccinic anhydride, propenylsuccinic anhydride, butenylsuccinic anhydride, triisobutenyl succinic anhydride, pentenylsuccinic anhydride, hexenylsuccinic anhydride, heptenylsuccinic anhydride, octenylsuccinic anhydride, nonenylsuccinic anhydride, decenyl succinic anhydride, dodecenyl succinic anhydride, hexadecenyl succinic anhydride, octadecenyl succinic anhydride, and mixtures thereof.

Accordingly, it is appreciated that e.g. the term "hexadecenyl succinic anhydride" comprises linear and branched hexadecenyl succinic anhydride(s). One specific example of linear hexadecenyl succinic anhydride(s) is n-hexadecenyl succinic anhydride such as 14-hexadecenyl succinic anhydride, 13-hexadecenyl succinic anhydride, 12-hexadecenyl succinic anhydride, 11-hexadecenyl succinic anhydride, 10-hexadecenyl succinic anhydride, 9-hexadecenyl succinic anhydride, 8-hexadecenyl succinic anhydride, 7-hexadecenyl succinic anhydride, 6-hexadecenyl succinic anhydride, 5-hexadecenyl succinic anhydride, 4-hexadecenyl succinic anhydride, 3-hexadecenyl succinic anhydride and/or 2-hexadecenyl succinic anhydride. Specific examples of branched hexadecenyl succinic anhydride(s) are 14-methyl-9-pentadecenyl succinic anhydride, 14-methyl-2-pentadecenyl succinic anhydride, 1-hexyl-2-decenyl succinic anhydride and/or iso-hexadecenyl succinic anhydride.

Furthermore, it is appreciated that e.g. the term "octadecenyl succinic anhydride" comprises linear and branched octadecenyl succinic anhydride(s). One specific example of linear octadecenyl succinic anhydride(s) is n-octadecenyl succinic anhydride such as 16-octadecenyl succinic anhydride, 15-octadecenyl succinic anhydride, 14-octadecenyl succinic anhydride, 13-octadecenyl succinic anhydride, 12-octadecenyl succinic anhydride, 11-octadecenyl succinic anhydride, 10-octadecenyl succinic anhydride, 9-octadecenyl succinic anhydride, 8-octadecenyl succinic anhydride, 7-octadecenyl succinic anhydride, 6-octadecenyl succinic anhydride, 5-octadecenyl succinic anhydride, 4-octadecenyl succinic anhydride, 3-octadecenyl succinic anhydride and/or 2-octadecenyl succinic anhydride. Specific examples of branched octadecenyl succinic anhydride(s) are 16-methyl-9-heptadecenyl succinic anhydride, 16-methyl-7-heptadecenyl succinic anhydride, 1-octyl-2-decenyl succinic anhydride and/or iso-octadecenyl succinic anhydride.

In one embodiment of the present invention, the at least one alkenyl mono-substituted succinic anhydride is selected from the group comprising hexenylsuccinic anhydride, octenylsuccinic anhydride, hexadecenyl succinic anhydride, octadecenyl succinic anhydride, and mixtures thereof.

In one embodiment of the present invention, the at least one mono-substituted succinic anhydride is one alkenyl mono-substituted succinic anhydride. For example, the one alkenyl mono-substituted succinic anhydride is hexenylsuccinic anhydride. Alternatively, the one alkenyl mono-substituted succinic anhydride is octenylsuccinic anhydride. Alternatively, the one alkenyl mono-substituted succinic anhydride is hexadecenyl succinic anhydride. For example, the one alkenyl mono-substituted succinic anhydride is linear hexadecenyl succinic anhydride such as n-hexadecenyl succinic anhydride or branched hexadecenyl succinic anhydride such as 1-hexyl-2-decenyl succinic anhydride. Alternatively, the one alkenyl mono-substituted succinic anhydride is octadecenyl succinic anhydride. For example, the one alkyl mono-substituted succinic anhydride is linear octadecenyl succinic anhydride such as n-octadecenyl succinic anhydride or branched octadecenyl succinic anhydride such iso-octadecenyl succinic anhydride, or 1-octyl-2-decenyl succinic anhydride.

In one embodiment of the present invention, the one alkenyl mono-substituted succinic anhydride is linear octadecenyl succinic anhydride such as n-octadecenyl succinic anhydride. In another embodiment of the present invention, the one alkenyl mono-substituted succinic anhydride is linear octenylsuccinic anhydride such as n-octenylsuccinic anhydride.

If the at least one mono-substituted succinic anhydride is one alkenyl mono-substituted succinic anhydride, it is appreciated that the one alkenyl mono-substituted succinic anhydride is present in an amount of ≥95 wt.-% and preferably of ≥96.5 wt.-%, based on the total weight of the at least one mono-substituted succinic anhydride.

In one embodiment of the present invention, the at least one mono-substituted succinic anhydride is a mixture of two or more kinds of alkenyl mono-substituted succinic anhydrides. For example, the at least one mono-substituted succinic anhydride is a mixture of two or three kinds of alkenyl mono-substituted succinic anhydrides.

If the at least one mono-substituted succinic anhydride is a mixture of two or more kinds of alkenyl mono-substituted succinic anhydrides, one alkenyl mono-substituted succinic anhydride is linear or branched octadecenyl succinic anhydride, while each further alkenyl mono-substituted succinic anhydride is selected from ethenylsuccinic anhydride, propenylsuccinic anhydride, butenylsuccinic anhydride, pentenylsuccinic anhydride, hexenylsuccinic anhydride, heptenylsuccinic anhydride, nonenylsuccinic anhydride, hexadecenyl succinic anhydride and mixtures thereof. For example, the at least one mono-substituted succinic anhydride is a mixture of two or more kinds of alkenyl mono-substituted succinic anhydrides, wherein one alkenyl mono-substituted succinic anhydride is linear octadecenyl succinic anhydride and each further alkenyl mono-substituted succinic anhydride is selected from ethenylsuccinic anhydride, propenylsuccinic anhydride, butenylsuccinic anhydride, pentenylsuccinic anhydride, hexenylsuccinic anhydride, heptenylsuccinic anhydride, nonenylsuccinic anhydride, hexadecenyl succinic anhydride and mixtures thereof. Alternatively, the at least one mono-substituted succinic anhydride is a mixture of two or more kinds of alkenyl mono-substituted succinic anhydrides, wherein one alkenyl mono-substituted succinic anhydride is branched octadecenyl succinic anhydride and each further alkenyl mono-substituted succinic anhydride is selected from ethenylsuccinic anhydride, propenylsuccinic anhydride, butenylsuccinic anhydride, pentenylsuccinic anhydride, hexenylsuccinic anhydride, heptenylsuccinic anhydride, nonenylsuccinic anhydride, hexadecenyl succinic anhydride and mixtures thereof.

For example, the at least one mono-substituted succinic anhydride is a mixture of two or more kinds of alkenyl mono-substituted succinic anhydrides comprising one or more hexadecenyl succinic anhydride, like linear or branched hexadecenyl succinic anhydride(s), and one or more octadecenyl succinic anhydride, like linear or branched octadecenyl succinic anhydride(s).

In one embodiment of the present invention, the at least one mono-substituted succinic anhydride is a mixture of two or more kinds of alkenyl mono-substituted succinic anhydrides comprising linear hexadecenyl succinic anhydride(s) and linear octadecenyl succinic anhydride(s). Alternatively, the at least one mono-substituted succinic anhydride is a mixture of two or more kinds of alkenyl mono-substituted succinic anhydrides comprising branched hexadecenyl succinic anhydride(s) and branched octadecenyl succinic anhydride(s). For example, the one or more hexadecenyl succinic anhydride is linear hexadecenyl succinic anhydride like n-hexadecenyl succinic anhydride and/or branched hexadecenyl succinic anhydride like 1-hexyl-2-decenyl succinic anhydride. Additionally or alternatively, the one or more octadecenyl succinic anhydride is linear octadecenyl succinic anhydride like n-octadecenyl succinic anhydride and/or branched octadecenyl succinic anhydride like iso-octadecenyl succinic anhydride and/or 1-octyl-2-decenyl succinic anhydride.

If the at least one mono-substituted succinic anhydride is a mixture of two or more kinds of alkenyl mono-substituted succinic anhydrides, one alkenyl mono-substituted succinic anhydride may be present in an amount of from 20 to 60 wt.-% and preferably of from 30 to 50 wt.-%, based on the total weight of the at least one mono-substituted succinic anhydride.

For example, if the at least one mono-substituted succinic anhydride is a mixture of two or more kinds of alkenyl mono-substituted succinic anhydrides comprising one or more hexadecenyl succinic anhydride(s), like linear or branched hexadecenyl succinic anhydride(s), and one or more octadecenyl succinic anhydride(s), like linear or branched hexadecenyl succinic anhydride(s), one or more octadecenyl succinic anhydride(s) may be present in an amount of from 20 to 60 wt.-% and preferably of from 30 to 50 wt.-%, based on the total weight of the at least one mono-substituted succinic anhydride.

It is also appreciated that the at least one mono-substituted succinic anhydride may be a mixture of at least one alkyl mono-substituted succinic anhydrides and at least one alkenyl mono-substituted succinic anhydrides.

If the at least one mono-substituted succinic anhydride is a mixture of at least one alkyl mono-substituted succinic anhydrides and at least one alkenyl mono-substituted succinic anhydrides, it is appreciated that the alkyl substituent of the of at least one alkyl mono-substituted succinic anhydrides and the alkenyl substituent of the of at least one alkenyl mono-substituted succinic anhydrides are preferably the same. For example, the at least one mono-substituted succinic anhydride is a mixture of ethylsuccinic anhydride and ethenylsuccinic anhydride. Alternatively, the at least one mono-substituted succinic anhydride is a mixture of propylsuccinic anhydride and propenylsuccinic anhydride. Alternatively, the at least one mono-substituted succinic anhydride is a mixture of butylsuccinic anhydride and butenylsuccinic anhydride. Alternatively, the at least one mono-substituted succinic anhydride is a mixture of triisobutyl succinic anhydride and triisobutenyl succinic anhydride. Alternatively, the at least one mono-substituted succinic anhydride is a mixture of pentylsuccinic anhydride and pentenylsuccinic anhydride. Alternatively, the at least one mono-substituted succinic anhydride is a mixture of hexylsuccinic anhydride and hexenylsuccinic anhydride. Alternatively, the at least one mono-substituted succinic anhydride is a mixture of heptylsuccinic anhydride and heptenylsuccinic anhydride. Alternatively, the at least one mono-substituted succinic anhydride is a mixture of octylsuccinic anhydride and octenylsuccinic anhydride. Alternatively, the at least one mono-substituted succinic anhydride is a mixture of nonylsuccinic anhydride and nonenylsuccinic anhydride. Alternatively, the at least one mono-substituted succinic anhydride is a mixture of decyl succinic anhydride and decenyl succinic anhydride. Alternatively, the at least one mono-substituted succinic anhydride is a mixture of dodecyl succinic anhydride and dodecenyl succinic anhydride. Alternatively, the at least one mono-substituted succinic anhydride is a mixture of hexadecanyl succinic anhydride and hexadecenyl succinic anhydride. For example, the at least one mono-substituted succinic anhydride is a mixture of linear hexadecanyl succinic anhydride and linear hexadecenyl succinic anhydride or a mixture of branched hexadecanyl succinic anhydride and branched hexadecenyl succinic anhydride. Alternatively, the at least one mono-substituted succinic anhydride is a mixture of octadecanyl succinic anhydride and octadecenyl succinic anhydride. For example, the at least one mono-substituted succinic anhydride is a mixture of linear octadecanyl succinic anhydride and linear octadecenyl succinic anhydride or a mixture of branched octadecanyl succinic anhydride and branched octadecenyl succinic anhydride.

In one embodiment of the present invention, the at least one mono-substituted succinic anhydride is a mixture of nonylsuccinic anhydride and nonenylsuccinic anhydride.

If the at least one mono-substituted succinic anhydride is a mixture of at least one alkyl mono-substituted succinic anhydrides and at least one alkenyl mono-substituted succinic anhydrides, the weight ratio between the at least one alkyl mono-substituted succinic anhydride and the at least one alkenyl mono-substituted succinic anhydride may be between 90:10 and 10:90 (wt.-%/wt.-%). For example, the weight ratio between the at least one alkyl mono-substituted succinic anhydride and the at least one alkenyl mono-substituted succinic anhydride may be between 70:30 and 30:70 (wt.-%/wt.-%) or between 60:40 and 40:60.

Alkenyl mono-substituted succinic anhydrides are well known to the skilled person and are commercially available, for example, from Bercen Inc, from Kemira or from Albemarle.

Further known alkenyl mono-substituted succinic anhydrides are branched hexadecenyl succinic anhydrides (CAS No. 32072-96-1), branched octadecenyl succinic anhydrides (CAS No. 28777-98-2) and 2,5-Furandione, dihydro-, mono-$C_{15-20}$-alkenyl derivs. (CAS No. 68784-12-3). According to a preferred embodiment of the present invention the at least one mono-substituted succinic anhydride is 2,5-Furandione, dihydro-, mono-$C_{15-20}$-alkenyl derivs. (CAS No. 68784-12-3).

The commercially available mono-substituted succinic anhydride solutions may optionally comprise further compounds, for example, mono-substituted succinic acid.

According to one embodiment of the present invention the at least one alkenyl mono-substituted succinic anhydride is used before compounding of the polymer composition in that the at least one mono-substituted succinic anhydride and/or salty reaction products thereof are present on the surface of the at least one calcium carbonate-comprising material.

According to a preferred embodiment of the present invention the at least one mono-substituted succinic anhydride and/or salty reaction products thereof are present on the surface of the at least one calcium carbonate-comprising material in the form of a surface treatment layer.

The term "surface treatment layer" or "surface treated filler material" in the meaning of the present invention refers to a calcium carbonate-comprising filler material which has been contacted with at least one mono-substituted succinic anhydride as surface treatment agent such as to obtain a coating layer comprising the at least one mono-substituted succinic anhydride and/or salty reaction products thereof on at least a part of the surface of the calcium carbonate-comprising filler material. Such surface-treated calcium carbonate-comprising materials and methods for preparing them are described in WO 2014/060286 A1.

Thus, it is appreciated that the treatment layer formed on the surface of the at least one calcium carbonate-comprising filler material comprises the at least one mono-substituted succinic anhydride and/or salty reaction product(s) thereof obtained from contacting the at least one calcium carbonate-comprising filler material with the at least one mono-substituted succinic anhydride. Salty reaction product(s) are, for example, one or more calcium salts of the at least one mono-substituted succinic anhydride.

Thus, it is appreciated that the surface treated filler material, comprises, preferably consists of, at least one calcium carbonate-comprising filler material and a treatment layer comprising at least one mono-substituted succinic anhydride and/or salty reaction product(s) thereof. The treatment layer is formed on the surface of said at least one calcium carbonate-comprising filler material.

In one embodiment of the present invention the treatment layer on the surface of the at least one calcium carbonate-comprising filler material comprises at least one mono-substituted succinic acid, wherein the at least one mono-substituted succinic acid is formed from the applied at least one mono-substituted succinic anhydride. In one embodiment of the present invention, the treatment layer formed on the surface of the at least one calcium carbonate-comprising filler material comprises the at least one mono-substituted succinic anhydride and at least one mono-substituted succinic acid or salty reaction product(s) thereof obtained from contacting the at least one calcium carbonate-comprising filler material with the at least one mono-substituted succinic anhydride and the optional at least one mono-substituted succinic acid. Alternatively, the treatment layer formed on the surface of the at least one calcium carbonate-comprising filler material comprises the at least one mono-substituted succinic anhydride and at least one mono-substituted succinic acid and salty reaction product(s) thereof obtained from contacting the at least one calcium carbonate-comprising filler material with the at least one mono-substituted succinic anhydride and the optional at least one mono-substituted succinic acid.

The treatment layer is preferably characterized in that the total weight of the at least one mono-substituted succinic anhydride and at least one mono-substituted succinic acid and/or salty reaction product(s) thereof on the surface of the surface treated filler material is from 0.1 to 5 mg/m$^2$, more preferably from 0.2 to 4 mg/m$^2$ and most preferably from 1 to 4 mg/m$^2$ of the at least one calcium carbonate-comprising filler material.

The treatment layer is preferably characterized in that the total weight of the at least one mono-substituted succinic anhydride and at least one mono-substituted succinic acid and/or salty reaction product(s) thereof on the surface of the surface treated filler material is from 0.05 to 1 wt.-%/m$^2$, more preferably from 0.1 to 0.5 wt.-%/m$^2$ and most preferably from 0.15 to 0.25 wt.-%/m$^2$ of the at least one calcium carbonate-comprising filler material.

Additionally or alternatively, the treatment layer of the surface treated filler material product comprises the at least one mono-substituted succinic anhydride and the at least one mono-substituted succinic acid and/or salty reaction product(s) thereof in a specific molar ratio. For example, the molar ratio of the at least one mono-substituted succinic anhydride and the at least one mono-substituted succinic acid to the salty reaction product(s) thereof is from 99.9:0.1 to 0.1:99.9, preferably from 70:30 to 90:10.

The wording "molar ratio of the at least one mono-substituted succinic anhydride and the at least one mono-substituted succinic acid to the salty reaction product(s) thereof" in the meaning of the present invention refers to the sum of the molecular weight of the at least one mono-substituted succinic anhydride and the sum of the molecular weight of the at least one mono-substituted succinic acid to the sum of the molecular weight of the mono-substituted succinic anhydride molecules in the salty reaction products thereof and the sum of the molecular weight of the mono-substituted succinic acid molecules in the salty reaction products thereof.

It is further appreciated that the obtained surface treated filler material comprises the treatment layer in an amount of from 0.1 to 4.0 wt.-%, preferably in an amount of from 0.1 to 2.5 wt.-%, more preferably in an amount of from 0.1 to 2 wt.-%, even more preferably in an amount of from 0.1 to 1.5 wt.-%, even more preferably in an amount of from 0.1 to 1 wt.-% and most preferably in an amount of from 0.2 to 0.8 wt.-% based on the total dry weight of the at least one calcium carbonate-comprising filler material.

In view of the very good results obtained, according to one preferred embodiment of the present invention the surface treated filler material comprises
a) at least one calcium carbonate-comprising filler material having
   i) a weight median particle size $d_{50}$ value in the range from 0.1 µm to 10 µm, and/or
   ii) a top cut $(d_{98}) \leq 15$ µm, and/or
   iii) a specific surface area (BET) of from 0.5 to 150 m$^2$/g as measured using nitrogen and the BET method according to ISO 9277:2010, and/or
   iv) a residual total moisture content of from 0.01 wt.-% to 1 wt.-%, based on the total dry weight of the at least one calcium carbonate-comprising filler material, and
b) a treatment layer on the surface of the at least one calcium carbonate-comprising filler material comprising at least one mono-substituted succinic anhydride and at least one mono-substituted succinic acid and/or salty reaction product(s) thereof.

According to another preferred embodiment of the present invention the surface treated filler material comprises
a) at least one calcium carbonate-comprising filler material having
   i) a weight median particle size $d_{50}$ value in the range from 0.1 µm to 10 µm, and/or
   ii) a top cut $(d_{98}) \leq 15$ µm, and/or
   iii) a specific surface area (BET) of from 0.5 to 150 m$^2$/g as measured using nitrogen and the BET method according to ISO 9277:2010, and/or
   iv) a residual total moisture content of from 0.01 wt.-% to 1 wt.-%, based on the total dry weight of the at least one calcium carbonate-comprising filler material, and
b) a treatment layer on the surface of the at least one calcium carbonate-comprising filler material comprising at least one mono-substituted succinic anhydride and at least one mono-substituted succinic acid and/or salty reaction product(s) thereof
wherein the surface treated filler material comprises the treatment layer in an amount of from 0.1 to 3 wt.-%, based on the total dry weight of the at least one calcium carbonate-containing filler material.

According to another embodiment of the present invention the at least one mono-substituted succinic anhydride is used during compounding of the polymer composition in that the at least one mono-substituted succinic anhydride is contacted under mixing with the polymer composition comprising polylactic acid as polymer component and at least one calcium carbonate-comprising material as filler. Therefore, the at least one mono-substituted succinic anhydride is not present on the surface of the calcium carbonate-comprising filler material before mixing and/or compounding. However, during the compounding step at least some of the mono-substituted succinic anhydride may be located on the surface of the calcium carbonate-comprising filler material. Therefore, the polymer composition comprises after compounding mono-substituted succinic anhydride, polylactic acid as polymer component at least one calcium carbonate-comprising material as filler, wherein part of the calcium carbonate-comprising filler material comprises a treatment layer on the surface of the at least one calcium carbonate-comprising filler material comprising at least one mono-substituted succinic anhydride and at least one mono-substituted succinic acid and/or salty reaction product(s) thereof.

According to another embodiment of the present invention the at least one mono-substituted succinic anhydride and/or salty reaction products thereof are present in the polymer composition in an amount of at least 0.1 wt.-%, based on the total dry weight of the at least one calcium carbonate-comprising filler material, preferably in an amount from 0.1 to 4.0 wt.-%, more preferably in an amount from 0.1 to 3.0 wt.-%, even more preferably in an amount from 0.2 to 2.0 wt.-%, even more preferably in an amount from 0.3 to 1.5 wt.-% and most preferably in an amount from 0.4 to 1.2 wt.-%.

According to another embodiment of the present invention the at least one mono-substituted succinic anhydride and/or salty reaction products thereof are present in the polymer composition in an amount of at least 0.005 wt.-%, based on the total weight of the polymer component, preferably in an amount from 0.01 to 5.0 wt.-%, more preferably in an amount from 0.02 to 1.0 wt.-%, even more preferably in an amount from 0.03 to 0.8 wt.-%, even more preferably in an amount from 0.05 to 0.5 wt.-% and most preferably in an amount from 0.07 to 0.3 wt.-%.

The inventors surprisingly found that by the use of at least one mono-substituted succinic anhydride before or during compounding of a polymer composition as described above the stability, especially the thermal stability of a polymer composition comprising polylactic acid as polymer component and calcium carbonate-comprising material as filler can be improved. Therefore, the polymer decomposition during processing is reduced. Additionally or alternatively, the processability of such a polymer composition can be facilitated. Also the mechanical properties, especially the melt flow rate of such polymer compositions can be improved.

More precisely, the inventors surprisingly found that by the use of at least one mono-substituted succinic anhydride before or during compounding of a polymer composition as described above the melt flow rate of such a compounded polymer composition can be reduced by at least 10%, measured according to DIN EN ISO 1133-1:2011 (procedure A, 2.16 kg, 210° C., granules), in comparison to the same polymer composition that has been treated the same way without at least one mono-substituted succinic anhydride.

The term "in comparison to the same polymer composition that has been treated the same way without at least one mono-substituted succinic anhydride" according to the present invention refers to a comparative polymer composition that does not comprise mono-substituted succinic anhydride. Apart from that the polymer composition according to the present invention and the comparative polymer composition are identical which means that they comprise the same compounds.

Furthermore, these two polymer compositions have been treated the same way which means that the compounding and storing treatments are identical.

According to one embodiment of the present invention by the use of at least one mono-substituted succinic anhydride before or during compounding of a polymer composition comprising polylactic acid as polymer component and at least one calcium carbonate-comprising material as filler, polymer decomposition during processing is reduced and/or the melt flow rate of such a compounded polymer composition is decreased by at least 10% preferably at least 15%, more preferably at least 20% and most preferably at least 25%, measured according to DIN EN ISO 1133-1:2011 (procedure A, 2.16 kg, 210° C., granules), in comparison to the same polymer composition that has been treated the same way without at least one mono-substituted succinic anhydride.

According to another embodiment of the present invention by the use of at least one mono-substituted succinic anhydride before or during compounding of a polymer composition comprising polylactic acid as polymer component and at least one calcium carbonate-comprising material as filler, the melt flow rate of such a compounded polymer composition is decreased by at least 10% preferably at least 15%, more preferably at least 20% and most preferably at least 25%, measured according to DIN EN ISO 1133-1:2011 (procedure A, 2.16 kg, 210° C., granules), in comparison to the same polymer composition that has been treated the same way without at least one mono-substituted succinic anhydride.

According to another embodiment of the present invention by the use of at least one mono-substituted succinic anhydride before or during compounding of a polymer composition consisting of polylactic acid as polymer component, further polymer components and at least one calcium carbonate-comprising material as filler, the melt flow rate of such an compounded polymer composition is decreased by at least 10% preferably at least 15%, more preferably at least 20% and most preferably at least 25%, measured according to DIN EN ISO 1133-1:2011 (procedure A, 2.16 kg, 210° C., granules), in comparison to the same polymer composition that has been treated the same way without at least one mono-substituted succinic anhydride.

According to another embodiment of the present invention by the use of at least one mono-substituted succinic anhydride before or during compounding of a polymer composition consisting of polylactic acid as polymer component and at least one calcium carbonate-comprising material as filler, the melt flow rate of such a compounded polymer composition is decreased by at least 10% preferably at least 15%, more preferably at least 20% and most preferably at least 25%, measured according to DIN EN ISO 1133-1:2011 (procedure A, 2.16 kg, 210° C., granules), in comparison to the same polymer composition that has been treated the same way without at least one mono-substituted succinic anhydride.

According to another embodiment of the present invention by the use of at least one mono-substituted succinic anhydride during compounding of a polymer composition consisting of polylactic acid as polymer component and at least one calcium carbonate-comprising material as filler, the melt flow rate of such a compounded polymer composition is decreased by at least 10% preferably at least 15%, more preferably at least 20% and most preferably at least 25%, measured according to DIN EN ISO 1133-1:2011 (procedure A, 2.16 kg, 210° C., granules), in comparison to the same polymer composition that has been treated the same way without at least one mono-substituted succinic anhydride, wherein the at least one mono-substituted succinic anhydride and/or salty reaction products thereof are present on the surface of the at least one calcium carbonate-comprising material.

According to another embodiment of the present invention the tensile strain at break of the polymer composition is increased by at least 40%, preferably by at least 100%, more preferably by at least 200% and most preferably by at least 300%, in comparison to the same polymer composition without at least one mono-substituted succinic anhydride.

Method for Reducing the Polymer Decomposition During Processing and/or Decreasing the Melt Flow Rate The present invention further comprises a method for reducing the polymer decomposition during processing and/or decreasing the melt flow rate of a polymer composition according to claim 1. More precisely, the polymer composition comprises polylactic acid as polymer component and at least one calcium carbonate-comprising material as filler. By the inventive method the melt flow rate may be decreased by at least 10%, measured according to DIN EN ISO 1133-1:2011 (procedure A, 2.16 kg, 210° C., granules), in comparison to the same polymer composition that has been treated the same way without at least one mono-substituted succinic anhydride. The method comprises the steps of a) providing at least one polylactic acid as polymer component and b) providing at least one calcium carbonate-comprising material as filler and c) providing at least one mono-substituted succinic anhydride and d) contacting the components of a), b) and c) in any order and e) compounding the contacted components of step d).

According to one embodiment of the present invention a method for reducing the polymer decomposition during processing and/or decreasing the melt flow rate of a polymer composition comprising polylactic acid as polymer component and at least one calcium carbonate-comprising material as filler, by at least 10%, measured according to DIN EN ISO 1133-1:2011 (procedure A, 2.16 kg, 210° C., granules), in comparison to the same polymer composition that has been treated the same way without at least one mono-substituted succinic anhydride is provided the method comprising a) providing at least one polylactic acid as polymer component and
b) providing at least one calcium carbonate-comprising material as filler and
c) providing at least one mono-substituted succinic anhydride
d) contacting the components of a), b) and c) in any order and
e) compounding the contacted components of step d).

According to step a) at least one polylactic acid as polymer component is provided as defined above. The polylactic acid may be provided in solid form or in molten form.

The term "solid" according to the present invention refers to a material that is solid under standard ambient temperature and pressure (SATP) which refers to a temperature of 298.15 K (25° C.) and an absolute pressure of exactly 100000 Pa (1 bar, 14.5 psi, 0.98692 atm). The solid may be in the form of a powder, tablet, granules, flakes etc.

The term "ambient pressure" according to the present invention refers to the standard ambient temperature pressure (SATP) which refers to an absolute pressure of exactly 100000 Pa (1 bar, 14.5 psi, 0.98692 atm).

The term "molten" according to the present invention refers to a material that is molten or viscous under standard ambient temperature and pressure (SATP) which refers to a temperature of 298.15 K (25° C.) and an absolute pressure of exactly 100000 Pa (1 bar, 14.5 psi, 0.98692 atm).

According to the preferred embodiment of the present invention the at least one polylactic acid may be provided in solid form and preferably in the form of granules or pellets.

According to another embodiment of the present invention further polymer components are provided in addition to the polylactic acid. The further polymer components may be, for example, polyesters as defined above. According to a preferred embodiment of the present invention only polylactic acid is provided as polymer component.

According to step b) at least one calcium carbonate-comprising filler material is provided as defined above. The calcium carbonate-comprising material may be provided in dry form.

The term "dry" or "dried" material is understood to be a material having between 0.001 to 0.5 wt.-% of water, based on the total weight of the calcium carbonate-comprising material weight.

According to one embodiment of the present invention the calcium carbonate-comprising material is provided in an amount from 0.1 to 85 wt.-%, based on the total weight of the polymer component, preferably in an amount from 3 to 50 wt.-%, more preferably in an amount from 5 to 40 wt.-%, and most preferably in an amount from 10 to 30 wt.-%.

According to step c) at least one mono-substituted succinic anhydride is provided as defined above.

According to one embodiment of the present invention that the at least one mono-substituted succinic anhydride is provided in a total amount of at least 0.1 wt.-%, based on the total dry weight of the at least one calcium carbonate-comprising filler material, preferably in an amount from 0.1 to 4.0 wt.-%, more preferably in an amount from 0.1 to 3.0 wt.-%, even more preferably in an amount from 0.2 to 2.0 wt.-%, even more preferably in an amount from 0.3 to 1.5 wt.-% and most preferably in an amount from 0.4 to 1.2 wt.-%.

According to one embodiment of the present invention the at least one mono-substituted succinic anhydride is provided in an amount of at least 0.005 wt.-%, based on the total weight of the polymer component, preferably in an amount from 0.01 to 5.0 wt.-%, more preferably in an amount from 0.02 to 1.0 wt.-%, even more preferably in an amount from 0.03 to 0.8 wt.-%, even more preferably in an amount from 0.05 to 0.5 wt.-% and most preferably in an amount from 0.07 to 0.3 wt.-%.

The at least one mono-substituted succinic anhydride is provided in solid form or as liquid. According to a preferred embodiment the at least one mono-substituted succinic anhydride is provided as liquid.

The liquid mono-substituted succinic anhydride according to the present invention refers to a material that has a viscosity of less than 5000, preferably of less than 2500, more preferably of less than 1000 mPa·s and most preferably of less than 500 mPa·s at +20° C. (±2° C.), when measured with the appropriate equipment e.g. Physica MCR 300 rheometer (Paar Physica) equipped with the measuring cell TEZ 150 P-C and the CC 28.7 measuring system at a shear rate of 5 s$^{-1}$ and at +20° C. (±2° C.).

If the at least one mono-substituted succinic anhydride is used in form of a surface layer on the surface of the at least one calcium carbonate-comprising material, the at least one mono-substituted succinic anhydride is provided in a quantity such that the total weight of said at least one mono-substituted succinic anhydride and/or the salty reaction products thereof on the surface of the at least one calcium carbonate-comprising filler material is less than 5 mg/m$^2$, preferably less than 4.5 mg/m$^2$ and most preferably less than 4.0 mg/m$^2$, of the at least one calcium carbonate-comprising filler material. For example, the at least one mono-substituted succinic anhydride is preferably provided in a quantity such that the total weight of the at least one mono-substituted succinic anhydride and/or the salty reaction products thereof is from 0.1 to 5 mg/m$^2$ more preferably from 0.2 to 4 mg/m² and most preferably from 1 to 4 mg/m² of the at least one calcium carbonate-containing filler material.

According to step d) the components of a), b) and c) are contacted in any order.

The contacting of step d) may be done under mixing conditions.

The skilled man will adapt the mixing conditions (such as the configuration of mixing time and mixing speed) according to his process equipment.

For example, the mixing and homogenization may take place by means of a ploughshare mixer. Ploughshare mixers function by the principle of a fluidized bed produced mechanically. Ploughshare blades rotate close to the inside wall of a horizontal cylindrical drum and convey the components of the mixture out of the product bed and into the open mixing space. The fluidized bed produced mechanically ensures intense mixing of even large batches in a very short time. Choppers and/or dispersers are used to disperse lumps in a dry operation. Equipment that may be used in the inventive process is available, for example, from Gebrüder Lödige Maschinenbau GmbH, Germany.

According to another embodiment of the present invention, process step d) can be carried out in a milling device, for example, in a ball mill, a hammer mill, a rod mill, a vibrating mill, a roll crusher, a centrifugal impact mill, a vertical bead mill, an attrition mill, a pin mill, or a hammer mill.

Process step d) may be carried out at temperatures between 15° C. and 150° C. and preferably at room temperature, i.e. at a temperature of 20° C.±2° C. According to one embodiment of the present invention, process step d) is carried out for at least 1 s, preferably for at least 1 min, e.g. for at least 15 min, 30 min, 1 hour, 2 hours, 4 hours, 6 hours, 8 hours, or 10 hours.

According to one embodiment, step d) comprises the steps of i) mixing the polymer component of step a) and the filler material of step b), and ii) mixing the mono-substituted succinic anhydride of step c) with the mixture of step i).

According to another embodiment, step d) comprises the steps of i) mixing the polymer component of step a) and the mono-substituted succinic anhydride of step c), and ii) mixing the filler material of step b) with the mixture of step i).

According to another embodiment, step d) comprises mixing the polymer component of step a), the mono-substituted succinic anhydride of step c), and the filler material of step b) simultaneously in one step.

According to another embodiment, step d) comprises the steps of i) mixing the polymer component of step a) and a part of the mono-substituted succinic anhydride of step c), ii) mixing the filler material of step b) and the remaining part of the mono-substituted succinic anhydride of step c), and iii) mixing the compositions of steps i) and ii). The mono-substituted succinic anhydride that is mixed with the polymer component and the mono-substituted succinic anhydride that is mixed with the filler material may be the same mono-substituted succinic anhydride or may be different mono-substituted succinic anhydrides. According to a preferred embodiment these mono-substituted succinic anhydrides are the same.

According to a preferred embodiment, step d) comprises the steps of i) mixing the filler material of step b) and the mono-substituted succinic anhydride of step c), and ii) mixing the polymer component of step a) with the mixture of step i). More precisely, in contacting step d) firstly the at least one calcium carbonate-comprising material of step b) is contacted under mixing, in one or more steps, with the at least one mono-substituted succinic anhydride of step c) such that a treatment layer comprising the at least one mono-substituted succinic anhydride and/or salty reaction product(s) thereof is formed on the surface of said at least one calcium carbonate-comprising material of step b), and secondly this surface-treated calcium carbonate-comprising material is contacted under mixing, in one or more steps, with the polylactic acid.

According to another preferred embodiment, step d) comprises the steps of i) mixing the filler material of step b) and a part of the mono-substituted succinic anhydride of step c), and ii) mixing the polymer component of step a) and the remaining part of the mono-substituted succinic anhydride with the mixture of step i). More precisely, in contacting step d) firstly the at least one calcium carbonate-comprising material of step b) is contacted under mixing, in one or more steps, with a part of the at least one mono-substituted succinic anhydride of step c) such that a treatment layer comprising the at least one mono-substituted succinic anhydride and/or salty reaction product(s) thereof is formed on the surface of said at least one calcium carbonate-comprising material of step b), and secondly this surface-treated calcium carbonate-comprising material is contacted under mixing, in one or more steps, with the polylactic acid and the remaining part of the mono-substituted succinic anhydride. The mono-substituted succinic anhydride that is mixed with the polymer component and the mono-substituted succinic anhydride that is mixed with the filler material may be the same mono-substituted succinic anhydride or may be different mono-substituted succinic anhydrides. According to a preferred embodiment these mono-substituted succinic anhydrides are different ones.

If in contacting step d) firstly the at least one calcium carbonate-comprising material of step b) is contacted under mixing, in one or more steps, with the at least one mono-substituted succinic anhydride of step c) or a part thereof such that a treatment layer comprising the at least one mono-substituted succinic anhydride and/or salty reaction product(s) thereof is formed on the surface of said at least one calcium carbonate-comprising material of step b), the contacting may be done as follows.

The contacting of the at least one calcium carbonate-comprising filler material with the at least one mono-substituted succinic anhydride may take place under mixing conditions. The skilled man will adapt these mixing conditions (such as the configuration of mixing pallets and mixing speed) according to his process equipment.

In one preferred embodiment of the present invention, the contacting of the at least one calcium carbonate-comprising filler material with the at least one mono-substituted succinic anhydride may be a continuous process. In this case, it is possible to contact the at least one calcium carbonate-comprising filler material with the at least one mono-substituted succinic anhydride in a constant flow, so that a constant concentration of the at least one mono-substituted succinic anhydride is provided.

Alternatively, the at least one calcium carbonate-comprising filler material is contacted with the at least one mono-substituted succinic anhydride in one step, wherein said at least one mono-substituted succinic anhydride is preferably added in one portion.

In another embodiment of the present invention, the contacting of the at least one calcium carbonate-comprising filler material with the at least one mono-substituted succinic anhydride may be a batch process, i.e. the at least one calcium carbonate-containing filler material is contacted with the at least one mono-substituted succinic anhydride in more than one steps, wherein said at least one mono-substituted succinic anhydride is preferably added in about equal portions. Alternatively, it is also possible to add the at least one mono-substituted succinic anhydride in unequal portions to the at least one calcium carbonate-containing filler material, i.e. in larger and smaller portions.

According to one embodiment of the present invention, contacting of the at least one calcium carbonate-comprising filler material with the at least one mono-substituted succinic anhydride is carried out in a batch or continuous process for a period of time from 0.1 to 5000 s. For example, contacting of the at least one calcium carbonate-comprising filler material with the at least one mono-substituted succinic anhydride is a continuous process and comprises one or several contacting steps and the total contacting time is from 0.1 to 4000 s, preferably from 0.5 to 3000 s and most preferably from 1 to 2000 s.

When implementing the at least one mono-substituted succinic anhydride it may feature a workable viscosity at about room temperature, i.e. the at least one mono-substituted succinic anhydride may be in a liquid state. It is thus one requirement of the present invention that the temperature is adjusted during contacting of the at least one calcium carbonate-comprising filler material with the at least one mono-substituted succinic anhydride such that the at least one mono-substituted succinic anhydride is molten.

Accordingly, it is appreciated that the temperature before and/or during contacting of the at least one calcium carbonate-comprising filler material with the at least one mono-substituted succinic anhydride is adjusted such that the temperature is at least 2° C. above the melting point of the at least one mono-substituted succinic anhydride. For example, the temperature before contacting of the at least one calcium carbonate-comprising filler material with the at least one mono-substituted succinic anhydride is adjusted such that the temperature is at least 2° C. above the melting point of the at least one mono-substituted succinic anhydride.

In one embodiment of the present invention, the temperature before and/or during contacting of the at least one calcium carbonate-comprising filler material with the at least one mono-substituted succinic anhydride is adjusted such that the temperature is at least 5° C., preferably, at least 8° C. and most preferably at least 10° C. above the melting point of the at least one mono-substituted succinic anhydride. For example, the temperature before and/or during contacting of the at least one calcium carbonate-comprising filler material with the at least one mono-substituted succinic anhydride is adjusted such that the temperature is from 2 to 50° C., preferably from 5 to 40° C., more preferably from 8 to 30° C. and most preferably from 10 to 20° C. above the melting point of the at least one mono-substituted succinic anhydride.

In one embodiment of the present invention, the contacting of the at least one calcium carbonate-comprising filler material with the at least one mono-substituted succinic anhydride is thus carried out at a treatment temperature of below 200° C. For example, the contacting of at least one calcium carbonate-comprising filler material with the at least one mono-substituted succinic anhydride is carried out at a treatment temperature of from 30 to 200° C., preferably of from 80 to 150° C. and most preferably of from 110 to 130° C.

The treatment time for carrying out the contacting of the at least one calcium carbonate-comprising filler material with the at least one mono-substituted succinic anhydride is carried out for a period of 5000 s or less, preferably for a period of 4000 s or less, more preferably for a period of 3000 s or less and most preferably from 0.1 to 2000 s. For example, contacting of the at least one calcium carbonate-comprising filler material with the at least one mono-substituted succinic anhydride is carried out for a period of 1200 s. In general, the length of contacting the at least one calcium carbonate-comprising filler material with the at least one mono-substituted succinic anhydride is determined by the treatment temperature applied during said contacting. For example, where a treatment temperature of about 200° C. is applied, the treatment time is as short as, for example, about 0.1. If a treatment temperature of about 120° C. is applied, the treatment time can be as long as, for example, about 1200 s.

In one embodiment of the present invention, the at least one calcium carbonate-comprising filler material is preheated, i.e. activated, before contacting of the at least one calcium carbonate-comprising filler material with the at least one mono-substituted succinic anhydride is carried out. That is to say, the at least one calcium carbonate-comprising filler material is treated at a temperature of from 50 to 200° C., preferably of from 80 to 200° C., more preferably of from 90 to 150° C. and most preferably of from 100 to 130° C. before contacting of the at least one calcium carbonate-comprising filler material with the at least one mono-substituted succinic anhydride is carried out. The treatment time for carrying out the preheating of the at least one calcium carbonate-comprising filler material is carried out for a period of 30 min or less, preferably for a period of 20 min or less and more preferably for a period of 15 min or less. In one embodiment of the present invention, the preheating of the at least one calcium carbonate-comprising filler material is carried out at a temperature that is of about equal to the temperature implemented during contacting of the at least one calcium carbonate-comprising filler material with the at least one mono-substituted succinic anhydride.

The term "equal" temperature in the meaning of the present invention refers to a preheating temperature that is at most 20° C., preferably at most 15° C., more preferably 10° C. and most preferably at most 5° C. below or above the temperature implemented during contacting of the at least one calcium carbonate-comprising filler material with the at least one mono-substituted succinic anhydride.

According to step e) the contacted components of step d) are compounded. The term "compounding" according to the present invention refers to the preparation of a polymer or plastic formulation. During compounding the contacted components of step d) are mixed and/or blended in a molten or softened state in order to achieve a homogenous blend of the different raw materials. Compounding methods are known to the skilled person.

According to one embodiment of the present invention the compounding and homogenization may take place by means of a dough kneader. Dough kneaders are able to mix and knead compositions and particularly those with a high viscosity. Dough kneaders function by rotating one or more Sigma- or Z-type blades horizontally inside a bowl or dish. Equipment that may be used is available, for example, from Kenwood Ltd.

According to another embodiment of the present invention the compounding and homogenization may take place by means of an extruder, for example a single or a twin screw extruder. Extruders are able to mix and compound compositions. Extruders function by rotating one or more screws inside a housing. Equipment that may be used may comprise a base unit and an extruder. For example, the base unit may be a Haake Polylab OS from Thermo Scientific and the extruder may be a Rheomex CTW 100 OS from Thermo Scientific.

According to another embodiment of the present invention the compounding and homogenization may take place by means of a laboratory compounder. Laboratory compounders are able to mix and knead compositions. Equipment that may be used may comprise a base unit, a compounder, and a kneader. For example, the base unit may be a Haake Polylab OS, the compounder may be a Haake Rheomix 600 OS and the kneader may be a Roller Roters 600, all from Thermo Scientific. RheoDrive7 may be used as software for evaluating the test results.

According to another embodiment of the present invention the compounding and homogenization may take place by means of a twin roll mill. Twin roll mills are able to mix and knead compositions. An exemplary roll mill is the Walzwerk 150×400 from Dr. Collin GmbH, Germany.

Process step e) may be carried out at temperatures between 15° C. and 150° C. and preferably at room temperature, i.e. at a temperature of 20° C.±2° C. According to one embodiment of the present invention, process step e) is carried out for at least 1 s, preferably for at least 1 min, e.g. for at least 15 min, 30 min, 1 hour, 2 hours, 4 hours, 6 hours, 8 hours, or 10 hours.

According to another embodiment, in the step e) heat and pressure may be applied. The heat and the pressure may be applied successively. In a preferred embodiment the heat and stress are applied simultaneously. In another preferred embodiment different steps of heat and/or pressure are applied successively.

For example, the heat and pressure conditions may take place by means of a hot press procedure. For hot pressing any pressure devices may be used that can additionally be heated during the pressing process. The heating can be performed, for example, by inductive heating or by indirect resistance heating. During the hot pressing the mould plates may be cooled by water cooling to control the temperature of the moulds. Equipment that may be used is available, for example, from Dr. Collin GmbH, Germany.

The hot pressing may be carried out at temperatures between 15° C. and 220° C., preferably at temperatures between 50° C. and 220° C., more preferably at temperatures between 70° C. and 220° C. and most preferably at temperatures of 210° C. The hot pressing may be carried out at pressures between 2 bar and 400 bar, preferably at pressures between 10 bar and 350 bar, more preferably at pressures between 15 bar and 300 bar and most preferably at pressures between 15 bar and 250 bar.

According to one embodiment of the present invention, the hot pressing is carried out for at least 1 s, preferably for at least 50 s or for at least 100 s, 120 s, 160 s, 180 s, 200 s or 240 s.

The inventors surprisingly found that by the method according to the present invention the stability, especially the thermal stability of a polymer composition comprising polylactic acid as polymer component and calcium carbonate-comprising material as filler can be improved. Therefore, the polymer decomposition during processing of such a polymer composition is reduced. Additionally or alternatively, the processability of such a polymer composition can be facilitated. Additionally or alternatively, the mechanical properties, for example, the melt flow rate of such polymer composition can be improved by the method according to the present invention.

More precisely, the inventors surprisingly found that by the method according to the present invention the polymer decomposition during processing is reduced and/or the melt flow rate of a polymer composition comprising polylactic acid as polymer component and at least one calcium carbonate-comprising filler material is reduced by at least 10%, preferably at least 15%, more preferably at least 20% and most preferably at least 25%, measured according to DIN EN ISO 1133-1:2011 (procedure A, 2.16 kg, 210° C., granules), in comparison to the same polymer composition that has been treated the same way without at least one mono-substituted succinic anhydride.

According to another embodiment of the present invention by the method according to the present invention the tensile strain at break of a polymer composition comprising polylactic acid as polymer component and at least one calcium carbonate-comprising filler material is increased by at least 40%, preferably by at least 100%, more preferably by at least 200% and most preferably by at least 300%, in comparison to the same polymer composition without at least one mono-substituted succinic anhydride.

Article According to the Present Invention

Another aspect of the present invention is directed to an article comprising a polymer composition obtainable by a process comprising the steps of
  a) providing at least one polylactic acid as polymer component and
  b) providing at least one calcium carbonate-comprising material as filler and
  c) providing at least one mono-substituted succinic anhydride
  d) contacting the components of a), b) and c) in any order and
  e) compounding the contacted components of step d),
  wherein the article is selected from the group comprising hygiene products, medical and healthcare products, filter products, geotextile products, agriculture and horticulture products, clothing, footwear and baggage products, household and industrial products, packaging products, construction products and the like.

According to steps a) to c) at least one polylactic acid as polymer component, at least one calcium carbonate-comprising material as filler and at least one mono-substituted succinic anhydride is provided as defined above.

According to steps d) and e) the components of a), b) and c) are contacted in any order and the contacted components of step d) are compounded as defined above.

The article is selected from the group comprising hygiene products, medical and healthcare products, filter products, geotextile products, agriculture and horticulture products, clothing, footwear and baggage products, household and industrial products, packaging products, construction products and the like.

Preferably, the hygiene products are selected from the group comprising absorbent hygiene products such as baby diapers or nappies, feminine hygiene, adult incontinence products, depilatory strips, bandages and wound dressings, disposable bath and face towels, disposable slippers and footwear, top sheets or coverstocks, consumer face masks, leg cuffs, acquisition/distribution layers, core wraps, back sheets, stretch ears, landing zones, dusting layers and fastening systems; and wipes such as wet wipes, skin care wipes, baby wipes, facial wipes, cleansing wipes, hand and body wipes, moist towelettes, personal hygiene wipes, feminine hygiene wipes, antibacterial wipes and medicated wipes.

Preferably, the medical and healthcare products are selected from the group comprising medical products which can be sterilized, medical packaging, caps like surgical disposable caps, protective clothing, surgical gowns, surgical masks and face masks, surgical scrub suits, surgical covers, surgical drapes, wraps, packs, sponges, dressings, wipes, bed linen, contamination control gowns, examination gowns, lab coats, isolation gowns, transdermal drug delivery, shrouds, underpads, procedure packs, heat packs, ostomy bag liners, fixation tapes, incubator mattress, sterilisation wraps (CSR wrap), wound care, cold/heat packs, drug delivery systems like patches.

Preferably, the filter products are selected from the group comprising gasoline filters, oil filters, air filters, water filters, coffee filters, tea bags, pharmaceutical industry filters, mineral processing filters, liquid cartridge and bag filters, vacuum bags, allergen membranes and laminates with nonwoven layers.

Preferably, the geotextile products are selected from the group comprising soil stabilizers and roadway underlayment, foundation stabilizers, erosion control, canals construction, drainage systems, geomembrane protection, frost protection, agriculture mulch, pond and canal water barriers, sand infiltration barrier for drainage tile and landfill liners.

Preferably, the agriculture and horticulture products are selected from the group comprising crop covers, plant protection, seed blankets, weed control fabrics, greenhouse shading, root control bags, bio-degradable plant pots, capillary matting, and landscape fabric.

Preferably, the clothing, footwear and baggage products are selected from the group comprising interlinings like fronts of overcoats, collars, facings, waistbands, lapels etc., disposable underwear, shoe components like shoelace eyelet reinforcement, athletic shoe and sandal reinforcement and inner sole lining etc., bag components, bonding agents, composition and (wash) care labels.

Preferably, the packaging products are selected from the group comprising interlinings like desiccant packaging, sorbents packaging, gift boxes, file boxes, nonwoven bags, book covers, mailing envelopes, Express envelopes, courier bags and the like.

Preferably, the household and industrial products are selected from the group comprising abrasives, bed linen like pocket cloth for pocket springs, separation layer, spring cover, top cover, quilt backing, duvet coverings, pillow cases etc., blinds/curtains, carpet/carpet backings like scatter rugs, carpet tiles, bath mats etc., covering and separation material, detergent pouches, fabric softener sheets, flooring, furniture/upholstery like inside lining, reverse fabric for cushions, dust cover, spring covering, pull strips etc., mops, table linen, tea and coffee bags, vacuum cleaning bags, wall-covering, wipes like household care wipes, floor care wipes, cleaning wipes, pet care wipes etc., automotive building, cable wrapping, civil engineering, filtration packaging, protective clothing, primary and secondary carpet backing, composites, marine sail laminates, tablecover laminates, chopped strand mats, backing/stabilizer for machine embroidery, packaging where porosity is needed, insulation like fiberglass batting, pillows, cushions, padding like upholstery padding, batting in quilts or comforters, consumer and medical face masks, mailing envelopes, tarps, tenting and transportation (lumber, steel) wrapping, disposable clothing like foot coverings and coveralls, and weather resistant house wraps.

Preferably, the construction products are selected from the group comprising house wrap, asphalt overlay, road and railroad beds, golf and tennis courts, wallcovering backings, acoustical wall coverings, roofing materials and tile underlayment, soil stabilizers and roadway underlayment, foundation stabilizers, erosion control, canals construction, drainage systems, geomembrane protection, frost protection, agriculture mulch, pond and canal water barriers, and sand infiltration barriers for drainage tile.

Use of the Compounded Polymer Composition

Another aspect of the present invention is directed to the use of a polymer composition obtainable by a process comprising the steps of
a) providing at least one polylactic acid as polymer component and
b) providing at least one calcium carbonate-comprising material as filler and
c) providing at least one mono-substituted succinic anhydride
d) contacting the components of a), b) and c) in any order and
e) compounding the contacted components of step d),
in hygiene products, medical and healthcare products, filter products, geotextile products, agriculture and horticulture products, clothing, footwear and baggage products, household and industrial products, packaging products, construction products and the like.

According to steps a) to c) at least one polylactic acid as polymer component, at least one calcium carbonate-comprising material as filler and at least one mono-substituted succinic anhydride is provided as defined above.

According to steps d) and e) the components of a), b) and c) are contacted in any order and the contacted components of step d) are compounded as defined above.

The polymer composition is used in hygiene products, medical and healthcare products, filter products, geotextile products, agriculture and horticulture products, clothing, footwear and baggage products, household and industrial products, packaging products, construction products and the like.

The following examples may additionally illustrate the invention but are not meant to restrict the invention to the exemplified embodiments.

DESCRIPTION OF THE FIGURES

FIG. 1 shows a graph of the values of the melt flow rate of CE1 and examples with 20 pph filler loading FIG. 2 shows a graph of the values of the melt flow rate of CE1 and examples with 10 pph filler loading FIG. 3 shows a graph of the values of the tensile strain at break of comparative examples CE1 to CE5 and inventive examples E1 to E5

EXAMPLES

Measurement Methods

The following measurement methods are used to evaluate the parameters given in the examples and claims.

Particle Size Distribution (Mass % Particles with a Diameter<X) and Weight Median Diameter ($d_{50}$) of a Particulate Material As used herein and as generally defined in the art, the "$d_{50}$" value is determined based on measurements made by using a Sedigraph 5100 of Micromeritics Instrument Corporation and is defined as the size at which 50% (the median point) of the particle mass is accounted for by particles having a diameter equal to the specified value.

The method and the instrument are known to the skilled person and are commonly used to determine grain size of fillers and pigments. The measurement is carried out in an aqueous solution of 0.1 wt.-% $Na_4P_2O_7$. The samples are dispersed using a high speed stirrer and supersonics.

BET Specific Surface Area of a Material

Throughout the present document, the specific surface area (in $m^2/g$) of the mineral filler is determined using the BET method (using nitrogen as adsorbing gas), which is well known to the skilled man (ISO 9277:1995). The total surface area (in $m^2$) of the mineral filler is then obtained by multiplication of the specific surface area and the mass (in g) of the mineral filler prior to treatment.

Amount of Surface-Treatment Layer

The amount of the treatment layer on the calcium carbonate-comprising filler material is calculated theoretically from the values of the BET of the untreated calcium carbonate-comprising filler material and the amount of mono-substituted succinic anhydride that is used for the surface-treatment. It is assumed that 100% of the mono-substituted succinic anhydride added to the calcium carbonate-comprising filler material are present as surface treatment layer on the surface of the calcium carbonate-comprising filler material.

Melt Flow Rate

The "melt flow rate" is measured on a CEAST Melt Flow modular line instrument from Instron. The instruments and the measuring method are known to the skilled person. The melt flow rate is measured according to DIN EN ISO 1133-1:2011 by using procedure A. The polymer samples to be measured are in the form of granules or pellets with a length of 1 mm to 5 mm. An amount between 6 to 9 g is used for the measurements. Measurement of the samples is made at 210° C. with a nominal load of 2.16 kg using a capillary die having an inner diameter of 2.095 mm and a length of 8.00 mm. The preheating without load is performed for 300 seconds and the measure length is 20 mm.

The melt flow rate is obtained under standard conditions. The term "standard conditions" according to the present invention refers to standard ambient temperature and pressure (SATP) which refers to a temperature of 298.15 K (25° C.) and an absolute pressure of exactly 100000 Pa (1 bar, 14.5 psi, 0.98692 atm). All measurements are performed on samples that have been stored under similar conditions after preparation.

Tensile Strain at Break

The "tensile strain at break" is measured on a Allround Z020 traction device from Zwick Roell. The instruments and the measuring method are known to the skilled person. The tensile strain at break is measured according to DIN EN ISO 527-2/1BA/50:2012, with a perforce of 0.1 MPa and a speed of 50 mm/min. The test specimen of the present invention have the geometry 1BA with the exception that the thickness of the samples is between 1.9±2 mm and the measuring length is 25×5 mm.

The tensile strain at break is obtained under standard conditions. All measurements are performed on samples that have been stored under similar conditions after preparation.

Materials

Calcium Carbonate-Comprising Filler Materials

Calcium Carbonate-Comprising Filler Material 1 (Powder 1)

Powder 1 is a dry ground calcium carbonate from Italy ($d_{50}$=2.6 µm, $d_{98}$=15 µm, BET specific surface area=2.6 $m^2/g$).

Calcium Carbonate-Comprising Filler Material 2 (Powder 2)

Powder 2 is a stearic acid-treated dry ground calcium carbonate from Italy ($d_{50}$=2.6 µm, $d_{98}$=15 µm, BET specific surface area=2.6 $m^2/g$).

Calcium Carbonate-Comprising Filler Material 3 (Powder 3)

1.00 kg of a dry ground calcium carbonate from Italy ($d_{50}$=2.6 µm, $d_{98}$=15 µm, BET specific surface area=2.6 $m^2/g$) is placed in a mixer (Somakon MP-LB Mixer, Somakon Verfahrenstechnik, Germany), and conditioned by stirring for 10 minutes (2000 rpm, 120° C.). After that time, 0.8 parts by weight relative to 100 parts by weight $CaCO_3$ of ASA 1 is added to the mixture. Stirring and heating is then continued for another 20 minutes (120° C., 2000 rpm). After that time, the mixture is allowed to cool and the free-flowing powder is collected (powder 3).

Calcium Carbonate-Comprising Filler Material 4 (Powder 4)

1.00 kg of a dry ground calcium carbonate from Italy ($d_{50}$=2.6 µm, $d_{98}$=15 µm, BET specific surface area=2.6 $m^2/g$) is placed in a mixer (Somakon MP-LB Mixer, Somakon Verfahrenstechnik, Germany), and conditioned by stirring for 10 minutes (2000 rpm, 120° C.). After that time, 0.4 parts by weight relative to 100 parts by weight $CaCO_3$ of ASA 1 is added to the mixture. Stirring and heating was then continued for another 20 minutes (120° C., 2000 rpm). After that time, the mixture is allowed to cool and the free-flowing powder is collected (powder 4).

Calcium Carbonate-Comprising Filler Material 5 (Powder 5)

1.00 kg of a dry ground calcium carbonate from Italy ($d_{50}$=2.6 µm, $d_{98}$=15 µm, BET specific surface area=2.6 $m^2/g$) is placed in a mixer (Somakon MP-LB Mixer, Somakon Verfahrenstechnik, Germany), and conditioned by stirring for 10 minutes (2000 rpm, 120° C.). After that time, 1.2 parts by weight relative to 100 parts by weight $CaCO_3$ of ASA 1 is added to the mixture. Stirring and heating is then continued for another 20 minutes (120° C., 2000 rpm). After that time, the mixture is allowed to cool and the free-flowing powder is collected (powder 5).

Polymer Component

Polylactic acid that is used as polymer component is commercially available from NatureWorks under the trade name Biopolymer 2003D. The polylactic acid is a PDLLA comprising 4.6 wt.-% of D isomers, based on the total weight of the polylactic acid. Furthermore, the PDLLA has a specific gravity of 1.24 and a glass transition temperature from 55 to 60° C. The PDLLA has residual monomer content of 0.21 wt.-%, based on the total weight of the polylactic acid.

Mono-Substituted Succinic Anhydride

ASA 1

Mono-substituted alkenyl succinic anhydride (2,5-Furandione, dihydro-, mono-$C_{15-20}$-alkenyl derivs., CAS No. 68784-12-3) is a blend of mainly branched octadecenyl succinic anhydrides (CAS #28777-98-2) and mainly branched hexadecenyl succinic anhydrides (CAS #32072-96-1). More than 80% of the blend is branched octadecenyl succinic anhydrides. The purity of the blend is >95 wt %. The residual olefin content is below 3 wt %.

Polymer Compounding Preparations

The compounded polymer compositions are prepared in a two-step synthesis.

In a first step, the polymer component polylactic acid is added to a twin roll mill (Collin 150, Walzwerk 150×400, Germany) followed by the addition of the calcium carbonate-comprising filler material after the PLA has melted. The mono-substituted succinic anhydride can be present on the surface of the calcium carbonate-comprising filler material and/or can be added separately afterwards. The compounding of the composition is done with a total amount of 120 g of material (filler+polymer+ASA) using the conditions given in table 1 below.

TABLE 1

Compounding conditions

| Composition | Calcium carbonate comprising filler material Polylactic acid as filler component additive | Various amounts Various amounts optional |
|---|---|---|
| Roll speed | 20 rpm | |
| Speed difference (typical) | −40% | |
| Thickness: | 0.6 mm | |
| Temperature | 200° C. | |

After obtaining a homogeneous mixture, the melt is removed from the rolls and added again (operation repeated 3 times) for a total compounding time on the roll mill of 11 minutes (unless indicated otherwise).

In a second step, the compounded polymer composition is treated in a press (Collin P 300 P, Dr. Collin, Germany). Approx. 90 g of the compounded polymer composition are cut in pieces and pressed between 2 metal plates to obtain sheets of the following dimensions: 169×169×2 mm$^3$. The used press program is given in table 2 below.

TABLE 2

Press conditions

| Temperature [° C.] | Time [s] | Pressure [bar] |
|---|---|---|
| 210 | 60 | 20 |
| 210 | 90 | 200 |
| cooling | 90 | 200 |

The compounding is performed in a room at 26±2° C. at 40-50% rH.

The amounts of the used materials and the formulation of the compounded polymer compositions is given in table 3 below.

TABLE 3

Compounded polymer compositions

| Example | Polymer component in weight parts | Calcium carbonate comprising filler material in weight parts | ASA in weight parts |
|---|---|---|---|
| CE1 | 100 | — | — |
| CE2 | 100 | Powder 1 (20) | — |
| CE3 | 100 | Powder 2 (20) | — |
| CE4 | 100 | Powder 1 (10) | — |
| CE5 | 100 | Powder 2 (10) | — |
| E1 | 100 | Powder 3 (20) | * |
| E2 | 100 | Powder 1 (20) | ASA 1 (0.16) |
| E3 | 100 | Powder 3 (10) | * |
| E4 | 100 | Powder 4 (20) | * |
| E5 | 100 | Powder 5 (20) | * |

* The ASA is present on the surface of the calcium carbonate-comprising material Melt Flow Rate Analysis of the Compounded Polymer Compositions The melt flow rate of comparative examples CE1 to CE5 and inventive example E1 to E5 is given in table 4 below. Furthermore, the melt flow rate of the neat polylactic acid as received from the supplier, which has not been subjected to the compounding conditions as described above is given as CE6.

TABLE 4 melt flow rate

| Example | MFR (g/10 min) | % reduction vs comparative example |
|---|---|---|
| CE6 | 8.6 | / |
| CE1 | 15.8 | / |
| CE2 | 40.4 | / |
| CE3 | 82.5 | / |
| CE4 | 31.2 | / |
| CE5 | 42.1 | / |
| E1 | 22.4 | 44.6% (CE2) |
| E2 | 28.8 | 28.7% (CE2) |
| E3 | 25.0 | 19.9% (CE4) |
| E4 | 28.2 | 30.2% (CE2) |
| E5 | 16.0 | 60.4% (CE2) |

As can be seen from the examples by the use of at least one mono-substituted succinic anhydride before or during compounding of a polymer composition comprising polylactic acid as polymer component and at least one calcium carbonate-comprising material as filler, it is possible to decrease the melt flow rate of such a compounded polymer composition. More precisely, it is possible to decrease the melt flow rate between 19.9% to 60.4% in comparison to the same polymer composition that has been treated the same way without at least one mono-substituted succinic anhydride. The measured results also are graphically visualized in FIGS. 1 and 2.

Tensile Strain at Break Analysis of the Compounded Polymer Compositions

The tensile strain at break of comparative examples CE1 to CE5 and inventive example E1 to E5 is given in table 5 below. All given results are average values of at least 5 tests.

TABLE 5

Tensile strain at break

| Example | Tensile strain at break (%) | % increase vs comparative example |
|---|---|---|
| CE1 | 3.1 | — |
| CE2 | 2.8 | — |
| CE3 | 2.6 | — |
| CE4 | 3.0 | — |
| CE5 | 2.6 | — |
| E1 | 13.3 | 375% (CE2) |
| E2 | 6.1 | 118% (CE2) |
| E3 | 7.2 | 140% (CE4) |
| E4 | 7.0 | 150% (CE2) |
| E5 | 12.4 | 343% (CE2) |

As can be seen from the examples by the use of at least one mono-substituted succinic anhydride before or during compounding of a polymer composition comprising polylactic acid as polymer component and at least one calcium carbonate-comprising material as filler, it is possible to increase the tensile strain at break of such a compounded polymer composition. More precisely, it is possible to increase the tensile strain at break between 118% to 375% in comparison to the same polymer composition that has been treated the same way without at least one mono-substituted succinic anhydride. The measured results also are graphically visualized in FIG. 3.

The invention claimed is:

1. A method for reducing the polymer decomposition during processing and/or decreasing the melt flow rate of a polymer composition comprising (a) a polymer component comprising at least one polylactic acid, (b) at least one mono-substituted succinic anhydride and/or salty reaction product(s) thereof, and (c) at least one calcium carbonate-comprising filler material, by at least 20%, measured according to DIN EN ISO 1133-1:2011 (procedure A, 2.16 kg, 210° C., granules), in comparison to the same polymer composition that has been treated the same way without the at least one mono-substituted succinic anhydride and/or salty reaction product(s) thereof, the method comprising contacting the at least one mono-substituted succinic anhydride and/or salty reaction product(s) thereof with the at least one calcium carbonate-comprising material before compounding, in that the at least one mono-substituted succinic anhydride and/or salty reaction product(s) thereof are present on the surface of the at least one calcium carbonate-comprising material;

wherein the at least one mono-substituted succinic anhydride and/or salty reaction product(s) thereof are present in the polymer composition in an amount of at least 0.1 wt.-%, based on the total dry weight of the at least one calcium carbonate-comprising filler material, wherein the calcium carbonate comprising material is present in the polymer composition in an amount from 5 to 40 wt.-%, based on the total weight of the polymer component, wherein the calcium carbonate-comprising material has
i) a weight median particle size $d_{50}$ value in the range from 0.1 μm to 10 μm and/or
ii) a top cut ($d_{98}$) of 15 μm and/or
iii) a specific surface area (BET) of from 0.5 to 150 m$^2$/g as measured using nitrogen and the BET method according to ISO 9277:2010 and/or
iv) a residual total moisture content of from 0.01 wt.-% to 1 wt.-%, based on the total dry weight of the at least one calcium carbonate-comprising material, wherein the ratio of the polylactic acid to optionally present further polymer components present in the polymer composition is from 99:1 to 20:80, based on the weight of the polymer components, and wherein the at least one mono-substituted succinic anhydride and/or salty reaction product(s) thereof comprises at least one alkenyl mono-substituted succinic anhydride and/or salty reaction product(s) thereof.

2. The method of claim 1, wherein the at least one mono-substituted succinic anhydride consists of succinic anhydride mono-substituted with a group selected from a linear, branched, aliphatic and cyclic group having a total amount of carbon atoms from C2 to C30 and in case of branched groups C3 to C30 in the substituent.

3. The method of claim 1, wherein the at least one mono-substituted succinic anhydride is at least one alkenyl mono-substituted succinic anhydride.

4. The method of claim 1, wherein the at least one mono-substituted succinic anhydride and/or salty reaction product(s) thereof are present in the polymer composition in an amount of from 0.2 to 1.5 wt.-%, based on the total dry weight of the at least one calcium carbonate-comprising filler material.

5. The method of claim 1, wherein the at least one mono-substituted succinic anhydride and/or salty reaction product(s) thereof are present in the polymer composition in an amount of from 0.4 to 1.2 wt.-%, based on the total dry weight of the at least one calcium carbonate-comprising filler material.

6. The method of claim 1, wherein the at least one mono-substituted succinic anhydride and/or salty reaction product(s) thereof are present in the polymer composition in an amount of from 0.1 to 1.2 wt.-%, based on the total dry weight of the at least one calcium carbonate-comprising filler material.

7. The method of claim 1, wherein the polymer component consists of at least one polylactic acid.

8. The method of claim 1, wherein the at least one mono-substituted succinic anhydride and/or salty reaction product(s) thereof are present in the polymer composition in an amount of at least 0.005 wt.-%, based on the total weight of the polymer component.

9. The method of claim 1, wherein the calcium carbonate-comprising material is selected from the group consisting of ground calcium carbonate, precipitated calcium carbonate, and mixtures thereof.

10. The method of claim 1, wherein the calcium carbonate-comprising material has
i) a weight median particle size $d_{50}$ value in the range from 0.25 μm to 7 μm and/or
ii) a top cut ($d_{98}$) of 12.5 μm and/or
iii) a specific surface area (BET) of from 1 to 60 m$^2$/g as measured using nitrogen and the BET method according to ISO 9277:2010 and/or
iv) a residual total moisture content of from 0.02 wt.-% to 0.5 wt.-%, based on the total dry weight of the at least one calcium carbonate-comprising material.

11. The method of claim 1, wherein the calcium carbonate-comprising material is present in the polymer composition in an amount from 0.1 to 85 wt.-%, based on the total weight of the polymer component.

12. The method of claim 1, wherein the polymer composition comprises further additives.

13. The method of claim 1, wherein the tensile strain at break of the polymer composition is increased by at least 40%, in comparison to the same polymer composition without the at least one mono-substituted succinic anhydride and/or salty reaction product(s) thereof.

14. The method of claim 1, wherein the tensile strain at break of the polymer composition is increased by at least 100%, in comparison to the same polymer composition without the at least one mono-substituted succinic anhydride and/or salty reaction product(s) thereof.

15. A method for reducing the polymer decomposition during processing and/or decreasing the melt flow rate of a polymer composition comprising (a) a polymer component comprising at least one polylactic acid, (b) at least one mono-substituted succinic anhydride and/or salty reaction product(s) thereof, and (c) at least one calcium carbonate-comprising material, by at least 20%, measured according to DIN EN ISO 1133-1:2011 (procedure A, 2.16 kg, 210° C., granules), in comparison to the same polymer composition that has been treated the same way without the at least one mono-substituted succinic anhydride and/or salty reaction product(s) thereof, the method comprising
a) providing a polymer component comprising at least one polylactic acid,
b) providing at least one calcium carbonate-comprising filler material,
c) providing at least one mono-substituted succinic anhydride and/or salty reaction product(s) thereof,
d) contacting the components of a), b) and c), and
e) compounding the contacted components of step d);
wherein in contacting step d) firstly the at least one calcium carbonate-comprising material of step b) is contacted under mixing, in one or more steps, with the at least one mono-substituted succinic anhydride and/or salty reaction product(s) thereof of step c) such that a treatment layer comprising the at least one mono-substituted succinic anhydride and/or salty reaction product(s) thereof is formed on the surface of said at least one calcium carbonate-comprising material of step b) in an amount of at least 0.1 wt.-%, based on the total dry weight of the at least one calcium carbonate-comprising filler material, and secondly this surface-treated calcium carbonate-comprising filler material is contacted under mixing, in one or more steps, with the polymer component, wherein the calcium carbonate comprising material is present in the polymer composition in an amount from 5 to 40 wt.-%, based on the total weight of the polymer component, wherein the calcium carbonate-comprising material has
i) a weight median particle size $d_{50}$ value in the range from 0.1 μm to 10 μm and/or
ii) a top cut ($d_{98}$) of 15 μm and/or
iii) a specific surface area (BET) of from 0.5 to 150 m$^2$/g as measured using nitrogen and the BET method according to ISO 9277:2010 and/or
iv) a residual total moisture content of from 0.01 wt.-% to 1 wt.-%, based on the total dry weight of the at least one calcium carbonate-comprising material, wherein the ratio of the polylactic acid to optionally present further polymer components present in the polymer composition is from 99:1 to 20:80, based on the weight of the polymer components, and wherein the at least one mono-substituted succinic anhydride and/or salty reaction product(s) thereof comprises at least one alkenyl mono-substituted succinic anhydride and/or salty reaction product(s) thereof.

16. A polymer composition obtainable by the method of claim 15.

17. The polymer composition of claim 16, wherein the polymer composition is suitable for use in hygiene products, medical products, healthcare products, filter products, geotextile products, agriculture products, horticulture products, clothing products, footwear products, baggage products, household products, industrial products, packaging products, or construction products.

18. An article comprising the polymer composition of claim 1.

19. The article of claim 18, wherein the article is selected from the group consisting of hygiene products, medical products, healthcare products, filter products, geotextile products, agriculture products, horticulture products, clothing products, footwear products, baggage products, household products, industrial products, packaging products, and construction products.

* * * * *